(12) United States Patent
Midorikawa

(10) Patent No.: US 7,419,026 B2
(45) Date of Patent: Sep. 2, 2008

(54) SEAT BELT DEVICE

(75) Inventor: Yukinori Midorikawa, Fujisawa (JP)

(73) Assignee: Autoliv Development AB, Vargarda (SE)

( * ) Notice: Subject to any disclaimer, the term of this patent is extended or adjusted under 35 U.S.C. 154(b) by 422 days.

(21) Appl. No.: 10/542,778

(22) PCT Filed: Jan. 20, 2004

(86) PCT No.: PCT/JP2004/000397

§ 371 (c)(1),
(2), (4) Date: Jul. 20, 2005

(87) PCT Pub. No.: WO2004/065183

PCT Pub. Date: Aug. 5, 2004

(65) Prior Publication Data

US 2006/0087108 A1    Apr. 27, 2006

(30) Foreign Application Priority Data

Jan. 23, 2003    (JP)    ............................. 2003-014692

(51) Int. Cl.
*B60R 22/48*    (2006.01)

(52) U.S. Cl. ...................................... 180/268; 280/807

(58) Field of Classification Search ................. 180/274, 180/281, 286; 280/807, 801.1, 808
See application file for complete search history.

(56) References Cited

U.S. PATENT DOCUMENTS

| 5,447,011 | A | * | 9/1995 | Harand et al. .................. 53/428 |
| 5,765,774 | A | * | 6/1998 | Maekawa et al. ......... 242/390.9 |
| 6,691,944 | B2 | * | 2/2004 | Fujii et al. ............... 242/390.9 |
| 6,829,952 | B2 | * | 12/2004 | Stanley et al. .......... 73/862.391 |

FOREIGN PATENT DOCUMENTS

| JP | 9-272401 | 10/1997 |
| JP | 11-170966 A | 6/1999 |
| JP | 2001-347923 | 12/2001 |
| JP | 2002-114130 | 4/2002 |
| JP | 2002-511360 | 4/2002 |
| JP | 2003-112599 | 4/2003 |

* cited by examiner

*Primary Examiner*—Ruth Ilan
(74) *Attorney, Agent, or Firm*—Jeffrey S. Melcher; Manelli Denison & Selter PLLC

(57) ABSTRACT

A seat belt for constraining an occupant to a seat is provided with both a tension varying means 16 allowing for providing a tension to the seat belt to vary, and a tension detecting means for detecting an actual tension on the seat belt. There is provided failure detecting means, which detects failures of at least one of the tension varying means and the tension detecting means by comparing the tension provided by the tension varying means to the actual tension detected by the tension detecting means the difference in tensions thereof exceeding a predetermined value.

11 Claims, 17 Drawing Sheets

SEAT BELT DEVICE

TECHNICAL FIELD

The present invention relates to a seat belt device that effectively constrains an occupant to a seat so as to protect the occupant upon a vehicle collision, and more particularly, to a seat belt device that includes a tension varying means allowing a tension given to a seat belt to vary and a tension detecting means for detecting a tension of the seat belt.

BACKGROUND ART

Conventionally, a seat belt device has been known in which, in order to prevent an occupant from traveling forwardly and colliding with parts of a vehicle or the like at the time of sudden stopping of the vehicle or the like, thereby protecting the occupant, an electromotive retractor serving as a tension varying means capable of allowing a tension given to a seat belt to vary according to a collision state is provided. For example, Patent Document 1 (JP-A No. 2000-52925 (FIG. 1, Paragraphs 0040, 0041, 0048, and 0049)) discloses a technology relating to a vehicle occupant constraining and protecting device (seat belt device) having an electromotive retractor (seat belt winding device) that winds and unwinds a seat belt for protecting an occupant. In the technology disclosed in Patent Document 1, in order to drive a seat belt winding device, a seat belt winding force is changed according to a tread power on a brake pedal provided in the vehicle and a tension of the seat belt is also changed.

Further, Patent Document 2 (JP-A No. 2001-163185 (FIG. 4, FIG. 6, Paragraphs 0028, and 0041 to 0043)) discloses a technology relating to a seat belt device having a seat belt winding device that includes a collision prediction part for avoiding a collision with an obstacle, such as another vehicle in front of a vehicle. In the technology disclosed in Patent Document 2, a distance between the vehicle and the obstacle, for example, is measured by a non-contact distance sensor, such as a laser radar, and, when the collision is likely to occur, a collision prediction signal is outputted to drive a motor, such that the seat belt winding device winds up the seat belt.

Further, a seat belt device has also been known in which a tension detecting means for measuring a tension given to the seat belt is provided to confirm an attachment state of the seat belt.

For example, Patent Document 3 (JP-A No. 2002-19581 (FIG. 9 and Paragraph 0009)) discloses a seat belt tension sensor having the following configuration. When the tension is given to a seat belt, the seat belt wound around a seat belt winding part pulls the seat belt winding part with respect to a supporting part. By doing so, a pivoting part rotates or is going to rotate around a rotational center. Accordingly, a power transmission part provided at an end of the pivoting part also rotates or is going to rotate, and the one end presses a load measuring part so that a force is exerted on the load measuring part. The force exerted on the load measuring part has a constant relationship with the tension given to the seat belt, so that the tension of the seat belt can be detected by detecting the force.

As regards the seat belt device including the electromotive retractor serving as the tension varying means described above, a seat belt device that has a failure diagnosis system of the electromotive retractor itself incorporated therein has been known.

For example, in Patent Document 4 (JP-A No. 11-170966 (FIG. 5 and Paragraph 0005)), a seat belt device has been suggested in which a failure diagnosing means for diagnosing a failure of a driving means based on a waveform of a current flowing in the driving means, when a predetermined voltage waveform is applied to the driving means for driving an electromotive retractor, is provided.

However, the failure diagnosing means disclosed in Patent Document 4 can detect the failure of the electromotive retractor of the tension varying means, but it cannot diagnose whether or not the tension varying means gives a predetermined tension to the seat belt.

Further, in the seat belt device having the tension detecting means disclosed in Patent Document 3, the failure of the tension detecting means cannot be diagnosed.

DISCLOSURE OF THE INVENTION

The invention has been made in consideration of the above-described problems, and it is an object of the invention to provide a seat belt device capable of detecting failures of respective means, whether or not a tension varying means gives a predetermined tension to a seat belt or whether or not a tension detecting means correctly detects a tension of the seat belt.

In order to solve the above-described problems, according to a first aspect of the invention, a seat belt device includes a seat belt for constraining an occupant to a seat, a tension varying means allowing a tension given to the seat belt to vary, a tension detecting means for detecting a tension of the seat belt, and a failure detecting means for comparing the tension given by the tension varying means to the tension detected by the tension detecting means, to detect failures of at least one of the tension varying means and the tension detecting means.

In accordance with the first aspect of the invention, the tension given by the tension varying means is detected by the tension detecting means, a signal corresponding to the tension to be given from the tension varying means to the seat belt is outputted to the failure detecting means, and a signal corresponding to the detected tension of the seat belt from the tension detecting means is outputted to the failure detecting means. The failure detecting means has a comparing means for calculating a difference of both signals and comparing the difference to a predetermined value. When the difference is smaller than the predetermined value, it can be judged that the tension varying means and the tension detecting means are normal. On the other hand, when the difference is larger than the predetermined value, it can be judged that the tension varying means is in failure, the tension detecting means is in failure, or both the tension varying means and the tension detecting means are in failure. That is, when the difference is larger than the predetermined value, it can be judged that at least one of the tension varying means and the tension detecting means is in failure. In addition, the predetermined value is selected in consideration of a sum of a tension caused by errors of the tension varying means and the tension detecting means and a tension that is a loss from the tension varying means to the tension detecting means by frictional resistance in the respective parts of the seat belt.

According to a second aspect of the invention, in the seat belt device according to the first aspect of the invention, the seat belt may be of three-point support type, one end thereof being supported at an electromotive retractor in such a manner as to be freely wound, the other end thereof being supported at a lap anchor part, and the midportion thereof being supported at a buckle stay part. The tension varying means may be provided at the electromotive retractor. The tension detecting means may be provided at the lap anchor part.

In accordance with the second aspect of the invention, when the tension varying means is provided at one end of the three-point support type seat belt, the tension detecting means is provided at the other end of the three-point support type seat belt. Therefore, the failures of at least one of the tension varying means and the tension detecting means can be detected regardless of whether or not the seat belt is attached to in the buckle stay part, that is, regardless of attachment/ detachment of the seat belt.

According to a third aspect of the invention, in the seat belt device according to the first aspect of the invention, the seat belt may be of three-point support type, one end thereof being supported at an electromotive retractor in such a manner as to be freely wound, the other end thereof being supported at a lap anchor part, and the midportion thereof being supported at a buckle stay part. The tension varying means and the tension detecting means may be arranged such that the tension varying means is provided at the retractor and the tension detecting means is provided at the buckle stay part, such that the tension varying means is provided at the buckle stay part and the tension detecting means is provided at the lap anchor part, or such that the tension varying means and the tension detecting means are provided at the buckle stay part. That is, at least one of the tension varying means and the tension detecting means is provided at the buckle stay part. The buckle stay part may be provided with an attachment/detachment detecting means for detecting an attachment of the seat belt. Further, the failure detecting means may be allowed to be actuated when the attachment/detachment detecting means is detecting the attachment of the seat belt.

In accordance with the third aspect of the invention, at least one of the tension varying means and the tension detecting means is provided at the buckle stay part. Therefore, when the attachment of the seat belt device is not detected by the attachment/detachment detecting means, the failure detection cannot be performed. That is, with the attachment of the seat belt, failures of at least one of the tension varying means and the tension detecting means can be detected.

BEST MODE FOR CARRYING OUT THE INVENTION

First Embodiment

Figure 1:
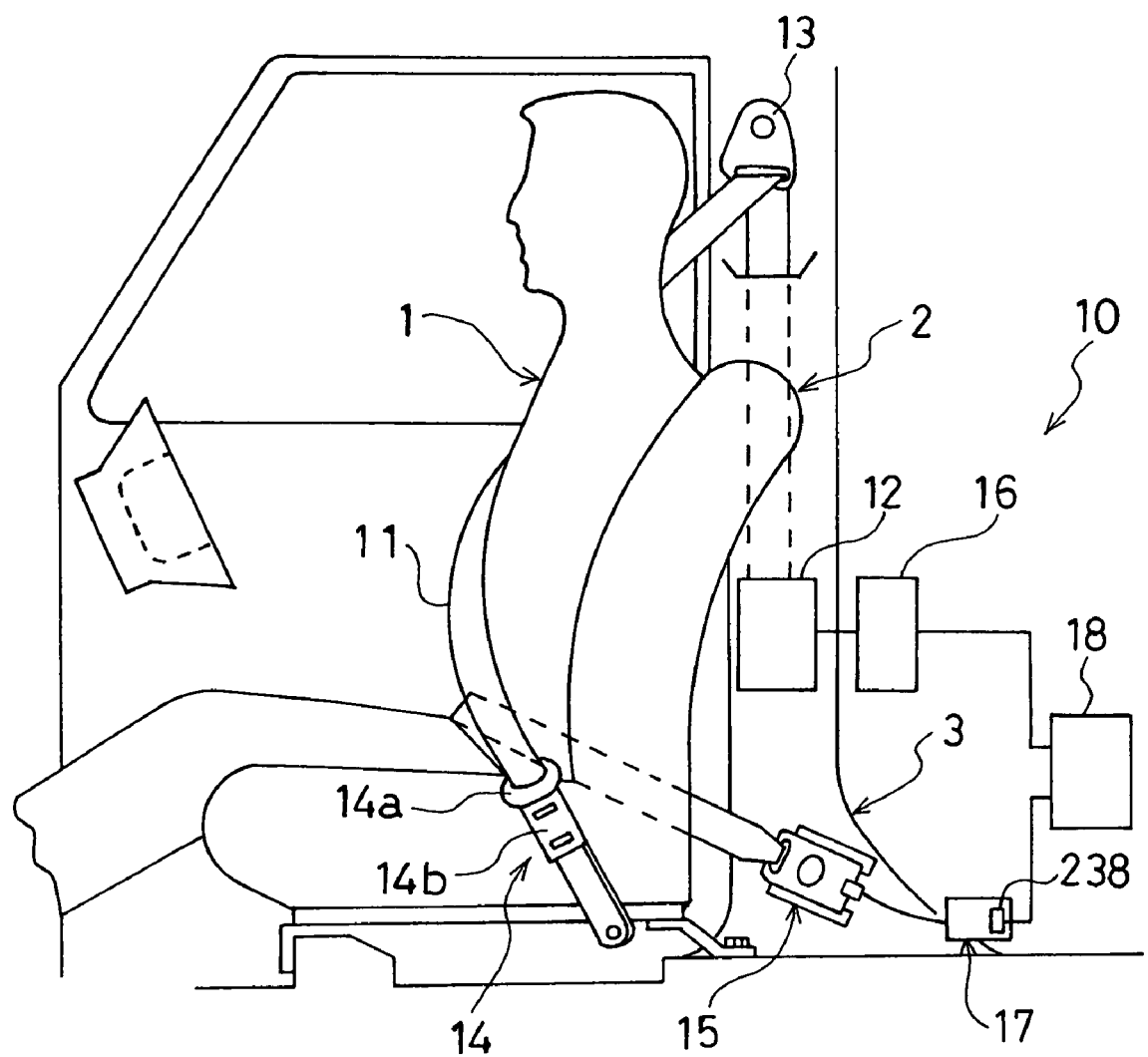
FIG. 1 is a diagram schematically showing an example of a seat belt device according to a first embodiment of the invention.

A seat belt device according to a first embodiment of the invention will be described with reference to FIG. 1. FIG. 1 is a diagram schematically showing an example of a seat belt device according to the first embodiment of the invention.

As shown in FIG. 1, the seat belt device 10 is of a three-point support type in which a seat belt 11 for constraining an occupant 1 to a seat 2, an electromotive retractor 12 installed on a side surface of a vehicle body 3 for winding one end of the seat belt 11 to allow a tension to vary, a shoulder through 13 installed on an upper side of the side surface of the vehicle body 3 for turning down the seat belt 11 in the vicinity of a shoulder of the occupant 1, a buckle stay part 14 for detachably engaging the midportion of the seat belt 11 at a lower side of the vehicle body 3 in the vicinity of a waist of the occupant, and a lap anchor part 15 for fixing the other end of the seat belt 11 on a lower side of the side surface of vehicle body 3.

The buckle stay part 14 includes a through tongue 14a for turning down the seat belt 11 and a buckle 14b installed on the lower side of the vehicle body to be detachably engaged with the through tongue 14a.

The seat belt device 10 further includes a tension detecting means 17 provided at the lap anchor part 15 and a failure detecting means 18 connected to a control unit 16 for controlling a motor of the electromotive retractor 12 and to the tension detecting means 17.

Figure 2:
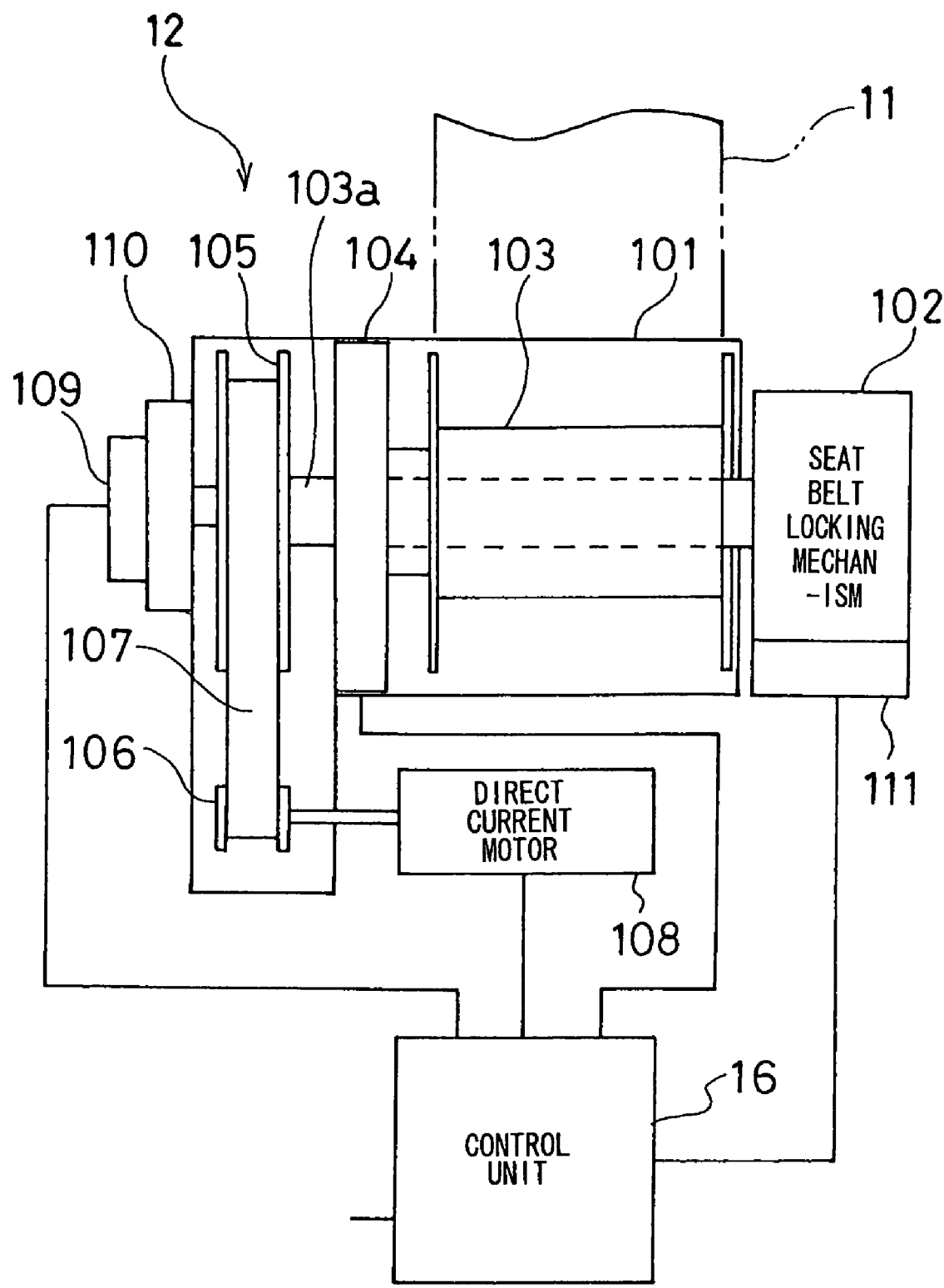
FIG. 2 is a diagram schematically showing a configuration of an electromotive retractor.
Figure 3:
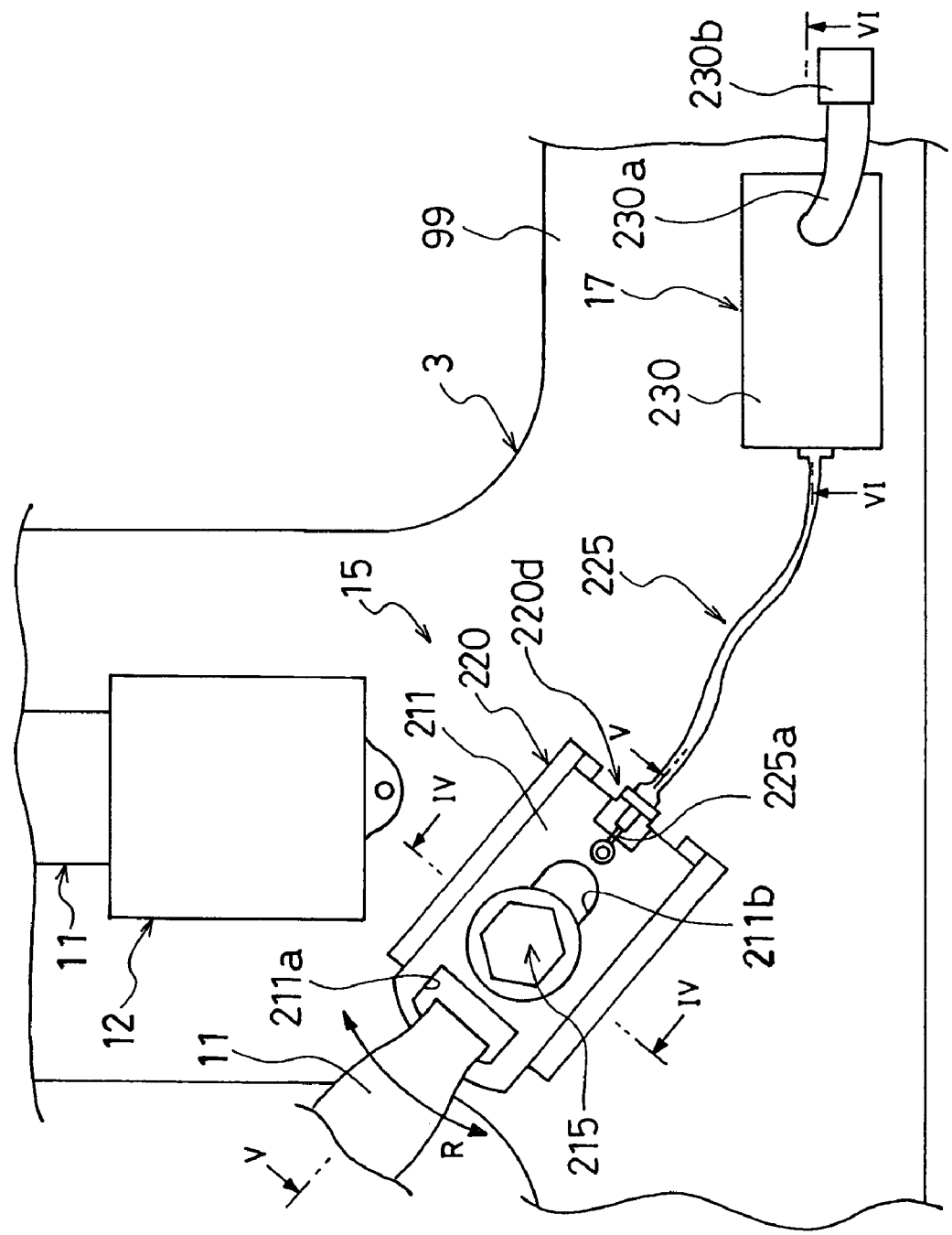
FIG. 3 is a diagram showing a structure of a lap anchor part into which a tension detecting means is incorporated.

The electromotive retractor (electromotive belt winding device) 12 includes the control unit 16 and a tension varying means. The electromotive retractor 12 will be described with reference to FIGS. 2 and 3. FIG. 2 is a diagram schematically showing the configuration of the electromotive retractor 12. FIG. 3 is a diagram schematically showing an example of a potentiometer.

As shown in FIG. 2, the electromotive retractor 12 includes a frame 101, a seat belt locking mechanism 102, a reel 103, a pre-tensioner 104, pulleys 105 and 106, a power transmission belt 107, a direct current (DC) motor (motor) 108, a potentiometer 109, a seat belt winding spring 110, and an electromagnetic actuator 111. In addition, as shown in FIG. 2, the electromotive retractor 12 is connected to the control unit 16.

The reel 103 and a reel shaft 103a are provided at the frame 101. The reel 103 is to wind the seat belt 11. The reel shaft 103a serves as a center axis of a reel rotation and has a left end coupled to the reel 103 and a right end coupled to the seat belt locking mechanism 102, which is described below. In addition, the reel shaft 103a is a twisted axis and serves as an energy absorption means. That is, in a state in which the right end of the reel shaft 103a is locked by the seat belt locking mechanism 102, when the seat belt 11 is unwound by an intensive force and the reel 103 rotates, the reel shaft 103a itself is twisted around the axis and plastically deformed. Therefore, the seat belt 11 is unwound so that the seat belt 11 absorbs impact energy acting on a body of the occupant.

The seat belt locking mechanism 102 is to lock unwinding of the seat belt 11 and includes a VSI operation to lock unwinding of the seat belt 11 when a predetermined deceleration is exerted on the vehicle, and a WSI operation to lock unwinding of the seat belt 11 when the seat belt 11 is unwound with a predetermined acceleration. In addition, the seat belt locking mechanism 102 may include an electromagnetic actuator 111, which is described below. Further, even when unwinding of the seat belt 11 is locked, the seat belt locking mechanism 102 is arranged such that the seat belt 11 can be wound by the direct current motor 108, which is described below.

The pre-tensioner 104 operates by an output of the collision detecting part (not shown) via the control unit 16 to rotate the reel shaft 103a in a retraction direction of the seat belt 11 and to constrain the occupant to the seat by forcibly winding the seat belt 11. The pre-tensioner 104 includes a pre-tensioner squib, such as a powder-type pre-tensioner or the like. For example, the pre-tensioner 104 includes a transmission mechanism for changing a piston movement caused by a gas pressure in a cylinder, in which a gas generated from a gas generator is sealed, into a rotational movement of the reel shaft 103a via a clutch mechanism.

The pulley 105 is fixed to the reel shaft 103a, and the pulley 106 is fixed to a shaft of the direct current motor 108, which is described below. The power transmission belt 107 is to connect the pulley 105 and the pulley 106. A predetermined number of external teeth are formed respectively at outer circumferences of the pulley 105 and the pulley 106, a predetermined number of internal teeth are also formed at an inner circumference of the power transmission belt 107, and a plurality of teeth for the pulley 105, the pulley 106, and the power transmission belt 107 are geared one another in exact quantities.

The direct current motor 108 is fixed to the frame 101 at two points or more and is operated by an output of the control unit 16. The rotation of the direct current motor 108 is transmitted to the reel shaft 103a through the pulley 106, the power transmission belt 107, and the pulley 105. Therefore, the direct current motor 108 rotates forwardly to wind the seat belt 11, and the direct current motor 108 rotates inversely to unwind the seat belt 11. In addition, the number of rotation of the direct current motor 108 is proportional to a current supplied to the direct current motor 108, and when the direct current motor 108 rotates forwardly, the current supplied to the direct current motor 108 is proportional to a tension of the seat belt 11. Accordingly, the electromotive retractor 12 and the control unit 16 constitute the tension varying means that can allow a tension given to the seat belt 11 to vary.

In addition, the value of a current flowing in the direct current motor 108 is detected as the value of a voltage corresponding to the current by a current detector provided at the control unit 16 serving as a motor driving circuit and is outputted to the failure detecting means 18, which is described below. The current of the direct current motor 108 has relation to a rotational torque of the direct current motor 108, so that the rotational torque, that is, the tension given to the seat belt 11, can be estimated by a load current value.

The potentiometer 109 is provided at the leftmost end of the reel shaft 103a, and includes a resistor (not shown) with both ends applied to a voltage and a slide member (not shown) geared with a rotation of the reel shaft 103a. Therefore, the voltage corresponding to a rotational amount from a reference position of the reel shaft 103a is outputted to the control unit 16, which is described below, and thus, for example, an unwinding amount of the seat belt 11 and a loosening amount of the seat belt 11 are estimated.

The seat belt winding spring 110 is to house the seat belt 11 in the electromotive retractor (electromotive belt winding device) 12 by a spring force, when the seat belt 11 is not attached. The electromagnetic actuator 111 is, for example, a solenoid, and forcibly operates the seat belt locking mechanism 102 in response to an instruction signal of the seat belt locking mechanism 102. An operation of the electromagnetic actuator 111 is controlled by an output of the control unit 16, which is described below.

The lap anchor part 15 has the tension detecting means 17 incorporated therein. When the buckle stay part 14 is in an engagement state as shown, when the tension is exerted on the seat belt 11 from the electromotive retractor 12, a tension corresponding to the tension acting on the seat belt 11 is exerted on the lap anchor part 15. In the meanwhile, even when the buckle stay part 14 is not in an engagement state as shown, when the tension is exerted on the seat belt 11 from the electromotive retractor 12, a tension corresponding to the tension acting on the seat belt 11 is exerted on the lap anchor part 15. This tension can be detected by the tension detecting means 17 provided at the lap anchor part 15.

Figure 4:
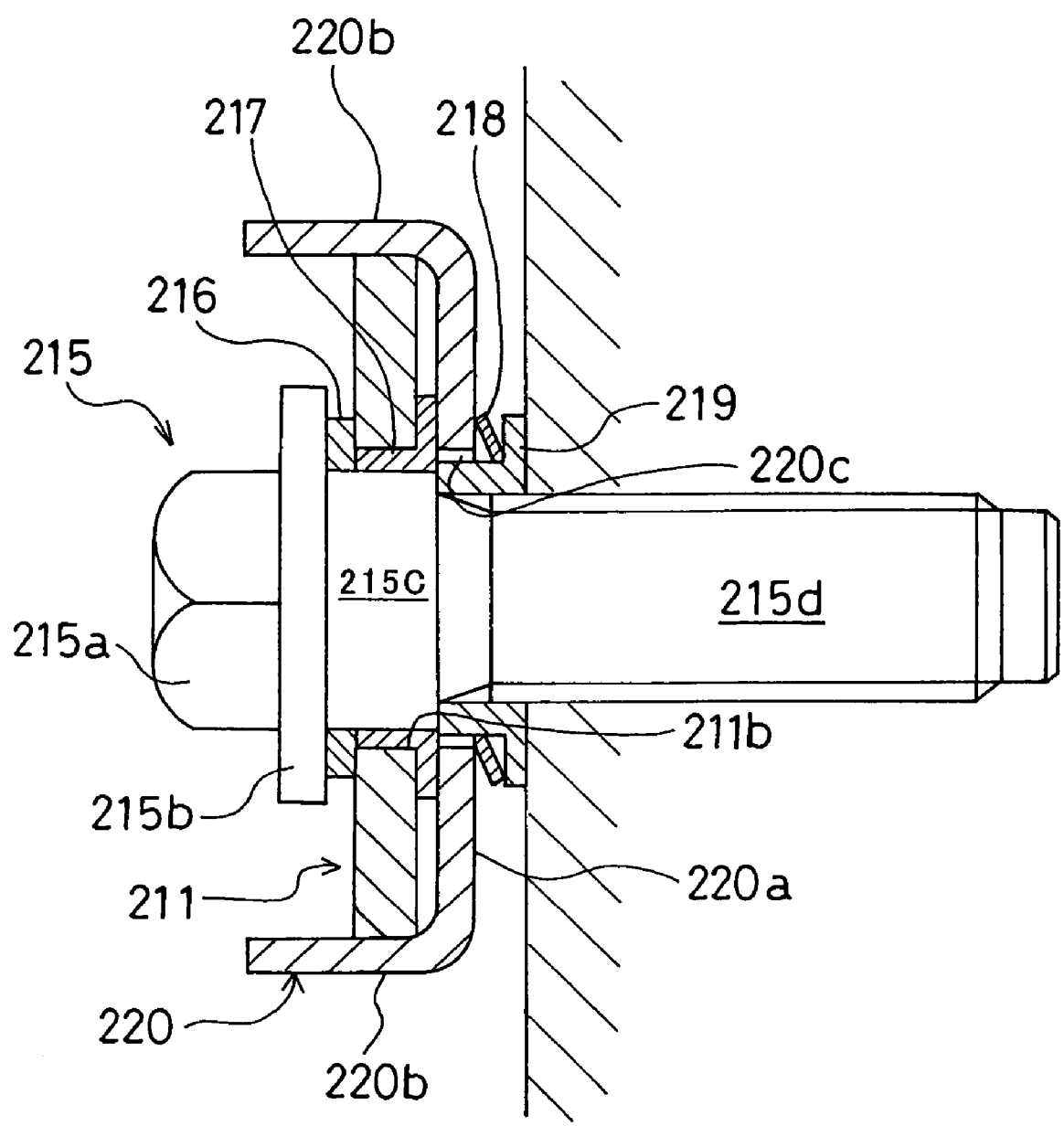
FIG. 4 is a cross-sectional view taken along the line IV-IV of FIG. 3.

The configuration of the lap anchor part 15 having the tension detecting means 17 incorporated therein will be described with reference to FIG. 3, FIG. 4, which is a cross-sectional view taken along the line IV-IV of FIG. 3, and FIG. 5, which is a cross-sectional view taken along the line V-V of FIG. 3. In addition, FIG. 6 is a cross-sectional view taken along the line VI-VI of FIG. 3.

The lap anchor part 15 is provided in a mounting structure of an anchor plate 211 and a base plate 220. The mounting structure includes an anchor bolt 215, a plastic washer 216 and a plastic L bush 217 as an abrasion and noise-prevention member, a wave washer 218 as a bias member, and an L bush 219 as a flange member. These members fix the base plate 220 to the vehicle body 3 and movably installed the anchor plate 211 on the base plate 220. The base plate 220 is a member having a U-shaped section and includes a backboard 220a and a pair of sideboards 220b and 220b. A fixing hole 220c, through which the anchor bolt 215 passes, is provided at the backboard 220a. The anchor plate 211 is slidably fit between the sideboards 220b and 220b of the base plate 220.

The anchor bolt 215 includes a flange part 215b that is disposed neighboring to a head part 215a and that has a diameter larger than the head part 215a, a step part 215c that is disposed neighboring to the flange part 215b and that has a diameter smaller than the flange part 215b, and a shaft part 215d that is disposed neighboring to the step part 215c and that has a diameter smaller than the step part 215c. The step part 215c passes through a long hole 211b of the anchor plate 211 and the shaft part 215d passes through a fixing hole 220c of the base plate 220 while being threaded into the vehicle body. The plastic washer 216 is fit outwardly into the step part 215c of the anchor bolt 215. In the plastic L bush 217 having a cylinder part and a flange part, the cylinder part is fit outwardly into the step part 215c and the cylinder part is slidably fit inwardly into the long hole 211b of the anchor plate 211. The flange part of the plastic L bush 217 is interposed between the anchor plate 211 and the backboard 220a of the base plate 220. With the plastic washer 216 and the plastic L bush 217, when the anchor plate 211 slides toward the base plate 220, sliding can be ensured between the anchor bolt 215 and the anchor plate 211 and between the anchor plate 211 and the base plate 220, while preventing noise and scraping caused by a metal contact.

The L bush 219 includes a cylinder part and a flange part, and the wave washer 218 is fit outwardly into the cylinder part. An outer diameter of the wave washer 218 is larger than that of the fixing hole 220c of the base plate 220. When the anchor bolt 215 is threaded into the vehicle body, a front end of the cylinder part of the L bush 219 comes in contact with the step part 215c of the anchor bolt 215. The wave washer 218 and the L bush 219 are interposed between the backboard 220a of the base plate 220 and the vehicle body. The base plate 220 and the anchor plate 211 are rotatably installed on the vehicle body with the anchor bolt 215 as a center. The wave washer 218 is constantly biased in a direction to separate the base plate 220 from the vehicle body, and thus, at the time of the rotation of the base plate 220, the noise can be prevented.

Figure 5:
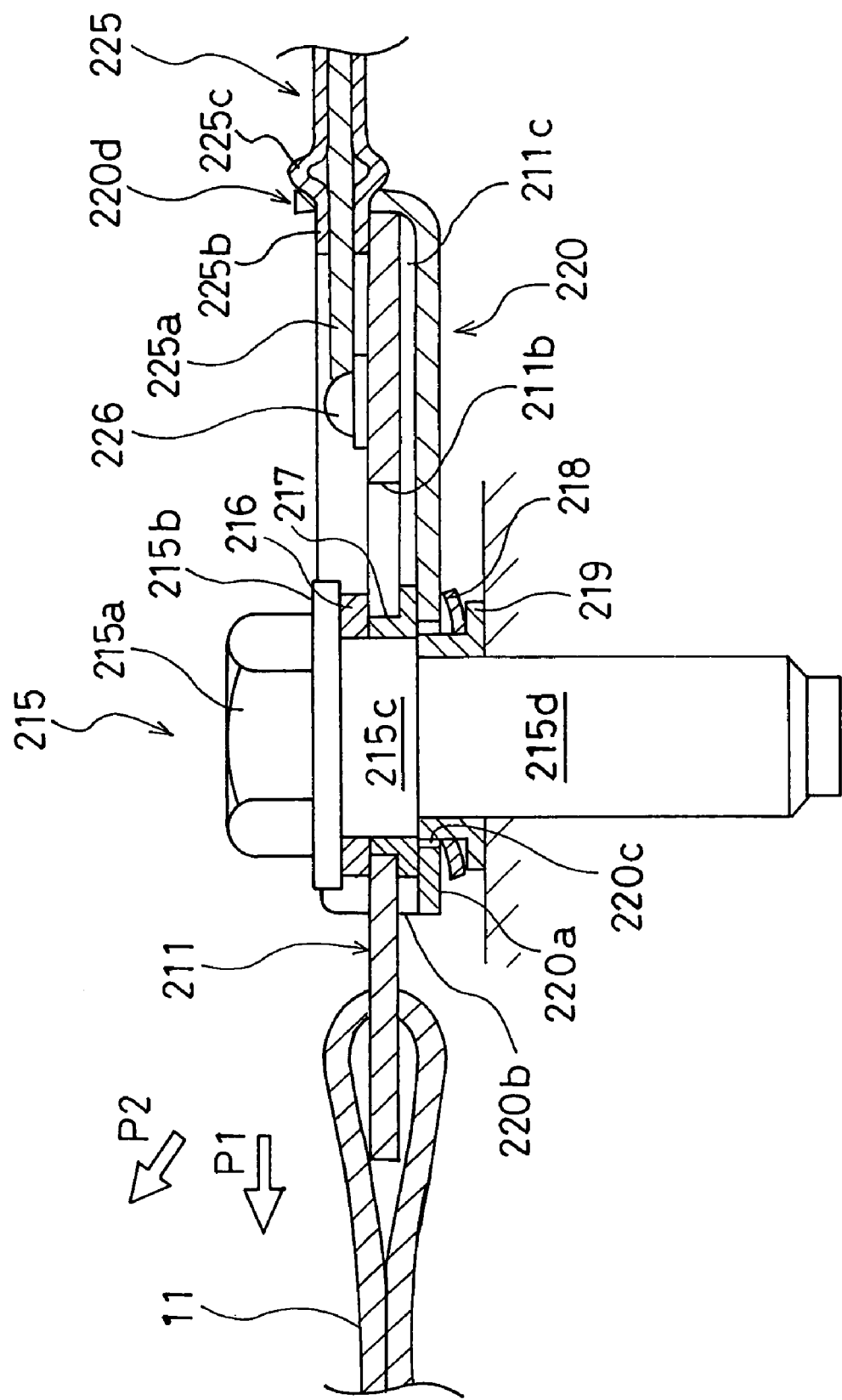
FIG. 5 is a cross-sectional view taken along the line V-V of FIG. 3.
Figure 6:
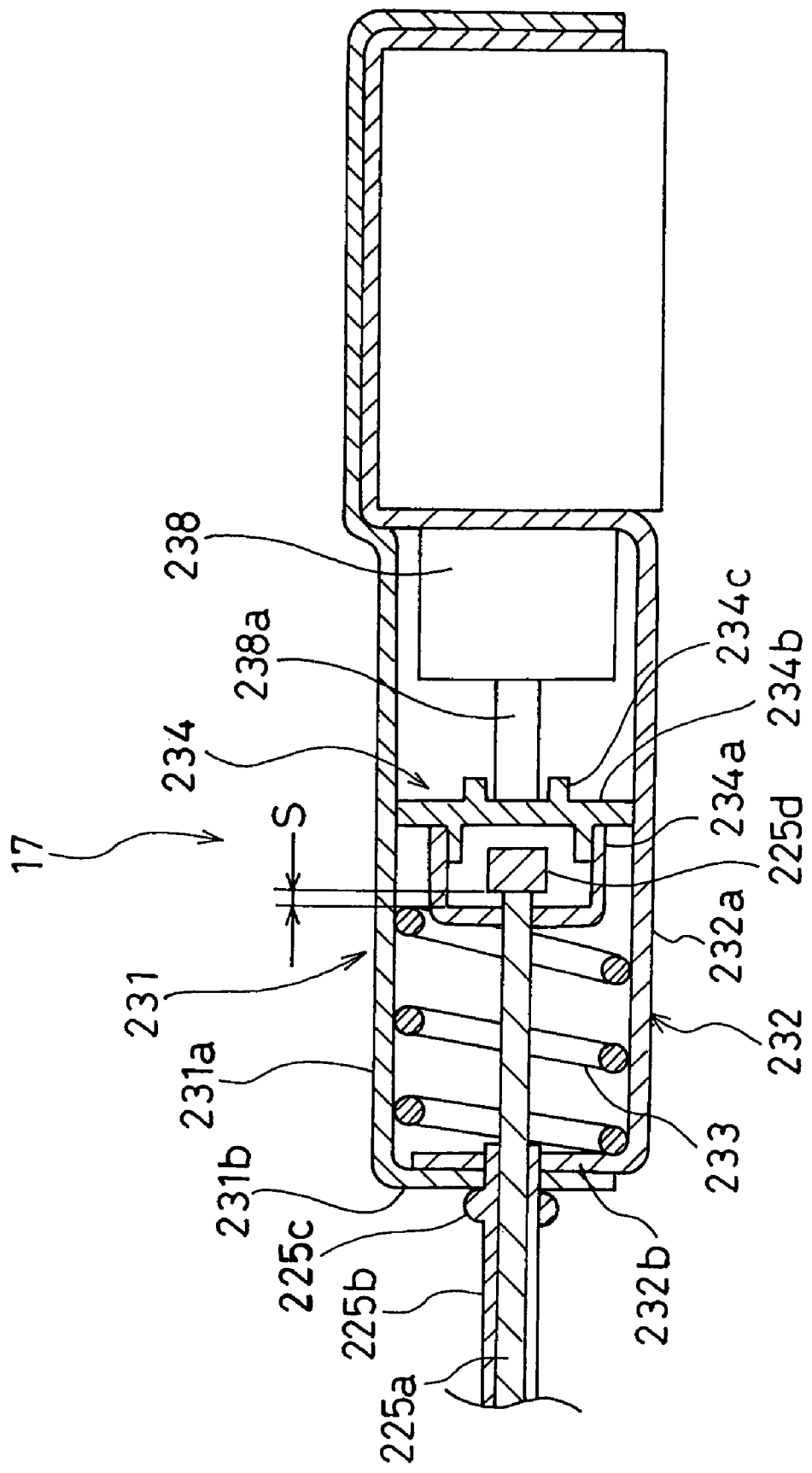
FIG. 6 is a cross sectional view taken along the line VI-VI of FIG. 3.

As shown in FIG. 5, one end of the backboard 220a has a wire guide part 220d disposed approximately at a center between the sideboards 220b and 220b. In the wire guide part 220d of the base plate 220, a through hole for a flexible wire 225 is provided at an end wall that rises from the backboard 220a and protrudes to an upper side than the anchor plate 211. The flexible wire 225 has a metal core member 225a having flexibility and an outer tube 225b as a covering material to cover the core member 225a. The outer tube 225b is made of a bulge part 225c as a stopping part that allows a portion neighboring to an outer side of the wire guide part 220d to be bent. The end of the core member 225a stops on an upper surface of the anchor plate 211 by a locking member 226. A guide convex part 211c coming in contact with the backboard 220a is provided on a lower surface of the anchor plate 211 (a surface facing the backboard 220a of the base plate 220) on an opposite side to a side where the seat belt 11 is engaged (right side in the drawing).

With the tension larger than a predetermined value given to the seat belt 11, the anchor plate 211 may be pulled by the seat belt 11 in an arrow P1 direction (left direction in the drawing), which is a surface direction of the anchor plate 211, or in an arrow P2 direction, which is a tilted direction toward a direction to be separated from the vehicle body with respect to the surface direction of the anchor plate 211. In this case, only the anchor plate 211 is guided between the sideboards 220b of the base plate 220 to move in the arrow P1 direction.

That is, while the anchor bolt 215 and the base plate 220 do not move, the plastic L bush 217 fit outwardly into the anchor bolt 215 relatively slides into the long hole 211b of the anchor plate 211. When the anchor plate 211 is pulled to a center and an upper side of a seat back, the anchor plate 211 is pulled in the arrow P2 direction shown in FIG. 5. In this case, the anchor plate 211 restricts the movement toward the upper side in FIG. 5 using the plastic washer 216 coming in contact with the flange part 215b of the anchor bolt 215. Further, since the guide convex part 211c comes in contact with the backboard 220a of the base plate 220, the anchor plate 211 smoothly moves in the arrow P1 direction, not being inclined in the arrow P2 direction.

The structure of the tension detecting means 17 incorporated into the lap anchor part 15 will be described with reference to FIG. 6. The tension detecting means 17 is incorporated into a unit 230 that has an upper case 231 and a lower case 232 to be integrated. The lower case 232 can be formed through a press process or the like and includes a backboard 232a and a sideboard 232b. In the lower case 232, a coil spring 233 serving as a bias member and a cap member 234 serving as a moving member are housed. The cap member 234 includes a cylinder cup member 234a having a bottom and a lid part 234b serving as a contact part. The lid part 234b can be formed through molding or the like.

The coil spring 233 is interposed between a bottom board of the cup part 234a of the cap member 234 and the sideboard 232b of the lower case 232. A sensing portion, the shaft 238a, of a linear potentiometer 238 comes in contact with a surface of the lid part 234b, which is inserted into an opening of the cup part 234a, on an opposite side to the side of the coil spring 233. An axial direction of the shaft 238a approximately matches an axial direction of the coil spring 233. The lid part 234b of the cap member 234 is provided with a misalignment-prevention convex part 234c to surround a front end of the shaft 238a. The linear potentiometer 238 is fixed to the lower case 232 through a screw stopper or the like. The upper case 231 includes a top board 231a to cover the lower case 232 and the linear potentiometer 238, and a sideboard 231b. The upper case 231 can be formed through a press deep drawing process or plastic die cast.

In order to allow the core member 225a and the outer tube 225b of the flexible wire member 225 to pass through the sideboard 231b of the upper case 231 and the sideboard 232b of the lower case 232, U-shaped notches (not shown) are provided in the sideboards 231b and 232b to face each other, respectively. In the outer tube 225b of the flexible wire member 225, a portion neighboring to the outer side of the sideboard 231b of the upper case 231 is bent to form the bulge part 225c. The core member 225a passes through the coil spring 233 in an axial direction and passes through the bottom board of the cup part 234a to be terminated within the cup part 234a. A terminal locking part 225d having a diameter larger than the core member 225a is provided at the end part of the core member 225a. At an initial state, as shown in the drawing, a gap S is provided between the terminal locking part 225d disposed in the cup part 234a and the bottom board of the cup part 234a. In addition, the coil spring 233 is not expanded and contracted.

The linear potentiometer 238 is connected to the failure detecting means 18, as shown in FIG. 1.

Returning to FIG. 3, the operation of the tension detecting means 17 is described. The flexible wire member 225 arranged between the anchor plate 211 and the unit 230 has a surplus length, so that the anchor plate 211 and the base plate 220 can turn the anchor bolt 215 according to the motion of a webbing W by a predetermined amount with the anchor bolt 215 as a center, as indicated by the arrow R. When the anchor plate 211 and the base plate 220 rotate, the core member 225a of the flexible wire member 225 may be pulled out by the anchor plate 211. However, as shown in FIG. 6, since the gap S is provided between the terminal locking part 225d of the core member 225a and the cup part 234a, there is no case in which the linear potentiometer 238 erroneously operates due to disturbance, as described above.

Therefore, when the predetermined tension acts on the seat belt 11, the anchor plate 211 is pulled out by the seat belt 11, and thus the anchor plate 211 relatively moves with respect to the vehicle body. Thus, in the unit 230 shown in FIG. 6, the terminal locking part 225d of the flexible wire member 225 comes in contact with the bottom board of the cup part 234a, while the cap member 234 is pulled by the flexible wire member 225 and moves due to a biasing force. Accordingly, the shaft 238a of the linear potentiometer 238 stretches and a change in voltage (current) corresponding to a relative movement between the anchor plate 211 and the vehicle body is outputted to the failure detecting means 18, which is described below. The linear potentiometer 238 measures a positional change of the cap member 234, such as a change in terminal position of the coil spring 233, rather than a positional change of the terminal locking part 225d of the flexible wire member 225, so that the tension acting on the seat belt 11 can be correctly detected electrically and linearly.

Figure 7:
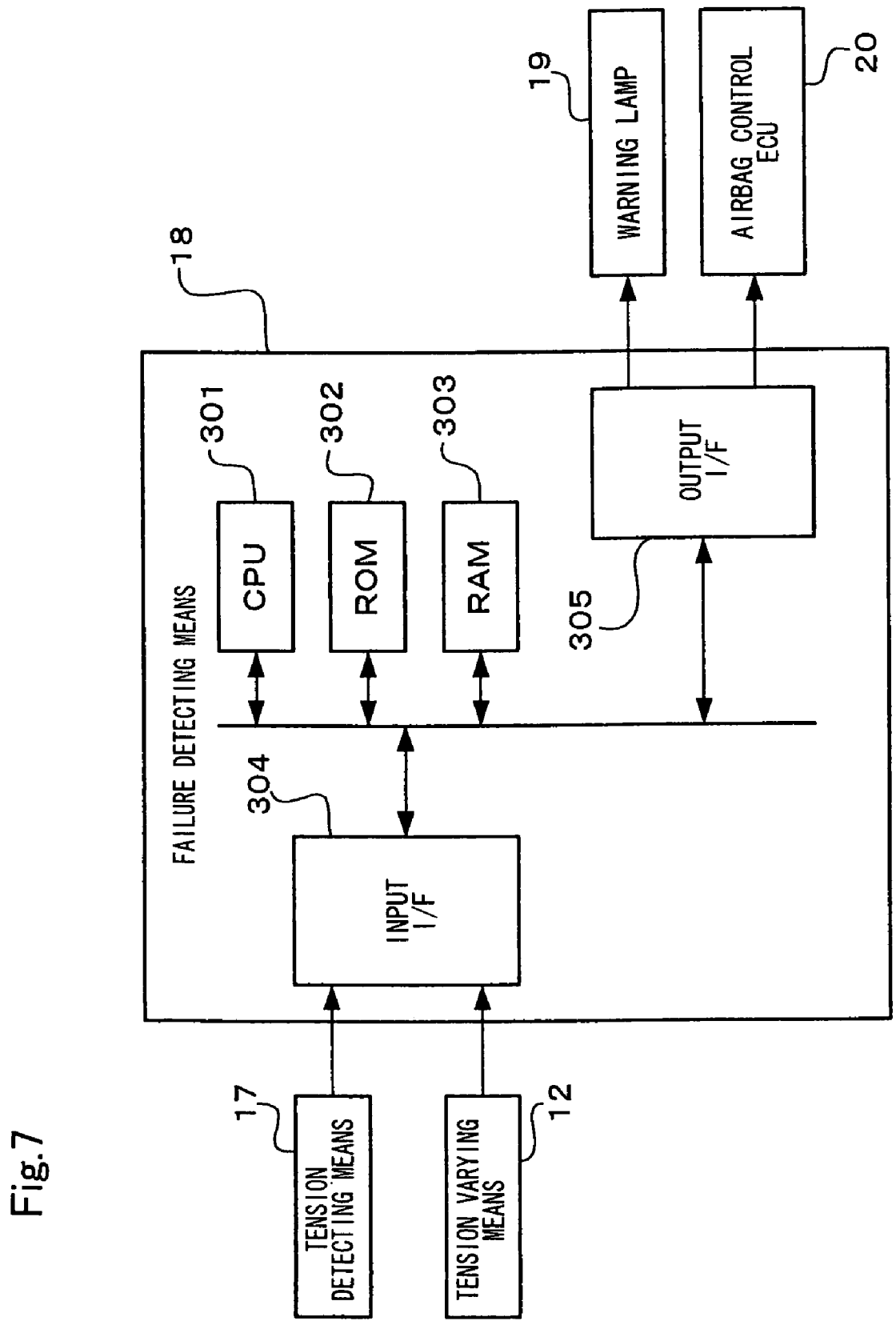
FIG. 7 is a diagram schematically showing a configuration of a failure detecting means according to the first embodiment of the invention.
Figure 8:
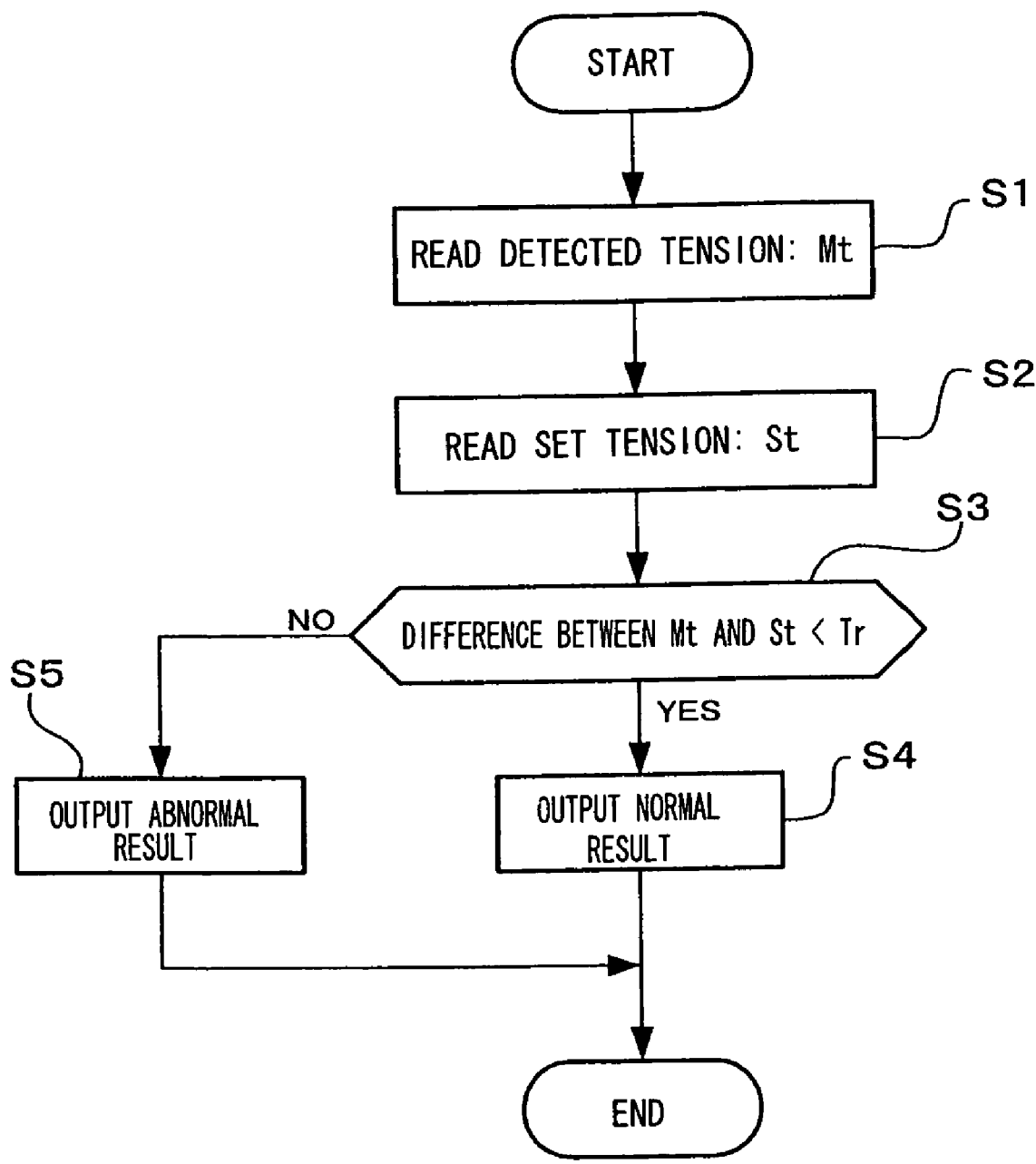
FIG. 8 is a flowchart showing a sequence of a control program of the failure detecting means according to the first embodiment of the invention.

Next, the failure detecting means 18 according to the first embodiment of the invention will be described with reference to FIGS. 7 and 8. FIG. 7 is a diagram schematically showing the configuration of the failure detecting means 18 according to the first embodiment of the invention. FIG. 8 is a flowchart showing the sequence of a control program of the failure detecting means.

As shown in FIG. 7, the failure detection means 18 includes a CPU (central processing unit) 301, a ROM (read only memory) 302, a RAM (random access memory) 303, an input interface 304, and an output interface 305.

The CPU 301 loads a control program and data stored in the ROM 302 into a work area of the RAM 303 and controls an operation of a warning lamp 19. The input interface 304 is connected to the tension varying means 12 and the tension detecting means 17. The output interface 305 is connected to the warning lamp 19 and an airbag control ECU 20.

Next, a control program concerning the failure detecting means 18 according to the first embodiment of the invention will be described with reference to FIG. 8. In addition, the CPU 301 periodically executes the control program, and thus the tension Mt detected from the tension detecting means 17 is read out (Step S1). Further, the tension St set by the tension varying means 12 is read out (Step S2).

Next, a difference Δ between the detected tension Mt and the set tension St is calculated and the difference is compared to a predetermined value Tr (Step S3). When the difference Δ is smaller than the predetermined value Tr (Step S3: YES), it is judged that it is normal, a normal result is outputted, and the control program ends (Step S4). When the difference Δ is larger than the predetermined value Tr (step S3: NO), it is judged that it is abnormal, an abnormal result is outputted, and the control program ends (Step S5). When the abnormal result is outputted, the warning lamp 19 turns on through the output interface 305, as shown in FIG. 6. In addition to or instead of turning on the lamp 19, an operation of the airbag is controlled through the airbag control ECU 20 according to the failure state of the seat belt device.

The predetermined value is selected as a value larger than a sum of the tension generated by an error of each of the tension varying means 12 and the tension detecting means 17, and the tension caused by frictional resistance of each part of the seat belt 11, such as the shoulder through 13, the buckle stay part, or the like, which is a loss from the tension varying means 12 to the tension detecting means 17.

In the seat belt device 10 shown in FIG. 1, the tension varying means 12 is provided at one end of the seat belt 11 and the tension detecting means 17 is provided at the other end of the seat belt 11. Therefore, as shown in FIG. 1, when the seat belt 11 is attached to the occupant and the tension varying means 12 gives an appropriate tension to the seat belt 11, the given tension is outputted as the set tension, and the output from the tension detecting means 17 is used as the detected tension, such that both can be compared to each other. In addition, even when the seat belt 11 is not attached, the tension varying means 12 gives an appropriate tension to the seat belt 11, the given tension is outputted as the set tension and the output from the tension detecting means 17 is used as the detected tension, such that both can be compared to each other. As such, failures of one or both of the tension varying means 12 and the tension detecting means 17 can be detected, regardless of whether or not the seat belt is attached. Therefore, the detachment state of the seat belt is confirmed by the seat belt attachment/detachment detecting means, and, by operating the tension varying means 12, the tension can be detected by the tension detecting means 17. In this case, the loss of the tension due to friction or the like of the buckle stay part 14 is lowered, and the predetermined value Tr is reduced with respect to the difference Δ between the detected tension Mt and the set tension St, such that precision of the failure detection can be enhanced.

Second Embodiment

Figure 9:
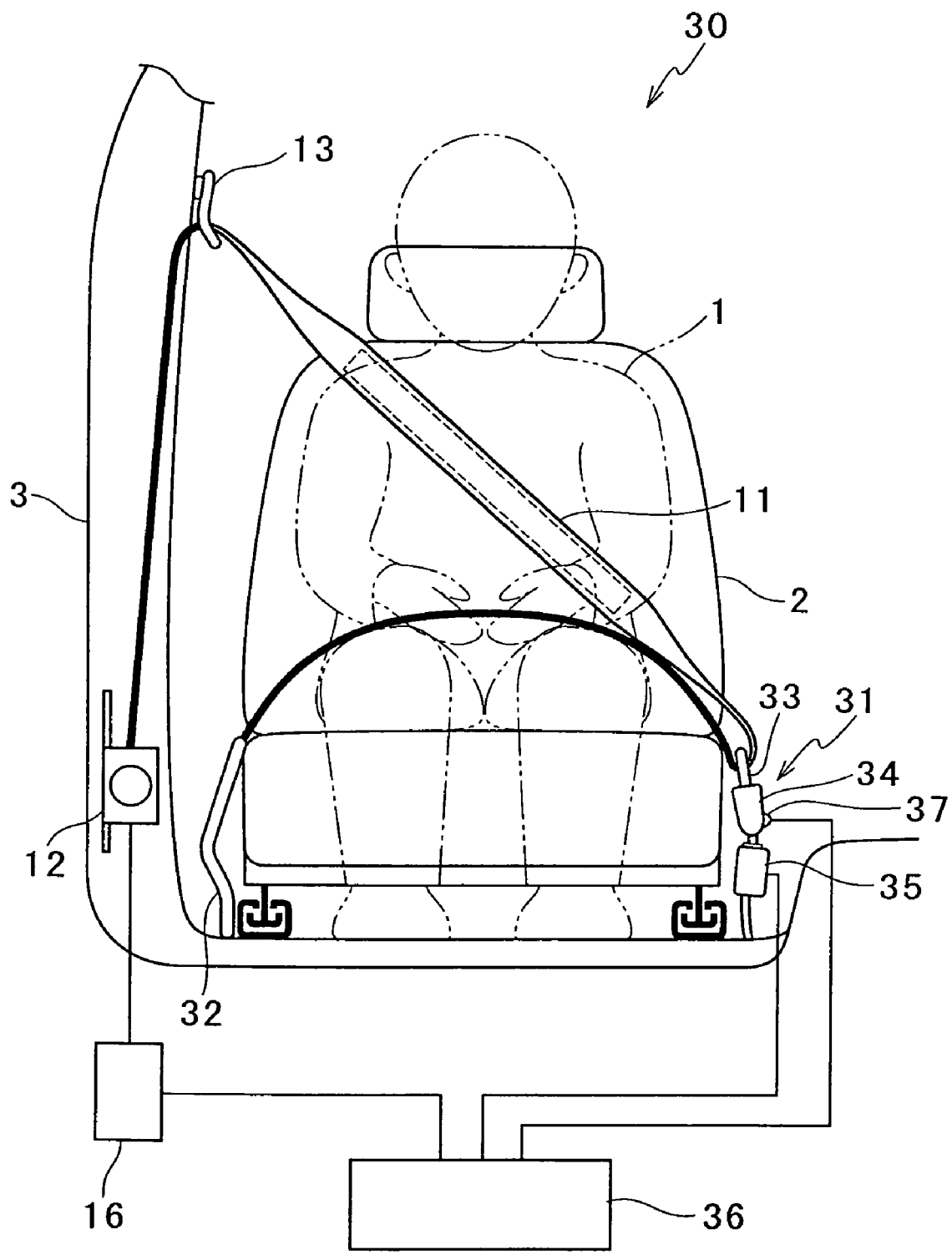
FIG. 9 is a diagram schematically showing a configuration of an electromotive belt winding device according to a second embodiment of the invention.

Next, a seat belt device 30 according to a second embodiment of the invention will be described with reference to FIGS. 9 to 11. FIG. 9 is a diagram schematically showing the configuration of an electromotive belt winding device according to the second embodiment of the invention.

The seat belt device 30 is of a three-point support type and includes a seat belt 11 for constraining an occupant 1 to a seat 2, an electromotive retractor 12 installed on a side surface of a vehicle body 3 for allowing a tension to vary by winding one end of the seat belt 11, a shoulder through 13 installed on an upper side of the side surface of the vehicle body 3 for turning down the seat belt 11 in the vicinity of a shoulder of the occupant 1, a buckle stay part 31 for removably engaging a midportion of the seat belt 11 on the lower side of the vehicle body 3 in the vicinity of a waist of the occupant, and a lap anchor part 32 for fixing the other end of the seat belt 11 on a lower side of the side surface of vehicle body 3.

The lap anchor part 32 is of a typical type and is fixed to the vehicle body. The buckle stay part 31 includes a through tongue 33 for turning down the seat belt 11, and a buckle 34 installed on the lower side of the vehicle body to be detachably engaged with the through tongue 33.

The seat belt device 30 further includes a tension detecting means 35 provided at the buckle 34 of the buckle stay part 31, a failure detecting means 36 connected to a control unit 16 for controlling a motor of the electromotive retractor 12 and to the tension detecting means 35, and an attachment/detachment detecting means (buckle switch) 37 for detecting an attachment/detachment of the through tongue 33.

The electromotive retractor (electromotive belt winding device) 12 includes the control unit 16 and the tension varying means. Here, the electromotive retractor 12 has the same parts as those in the first embodiment.

As described in the first embodiment, the tension detecting means 35 includes a mounting structure of the anchor plate 211 and the base plate 220, and a unit 230 in which the upper case 231 and the lower case 232 are incorporated in the same manner. That is, the tension about twice as large as the tension given to the seat belt 11 from the electromotive retractor 12 is detected by the tension detecting means 35. The tension can be detected in a state in which the seat belt 11 is attached to the buckle stay part 31. For this reason, the attachment/detachment detecting means 37 of the seat belt 11 is provided at the buckle 34.

Next, the failure detecting means 36 according to the second embodiment of the invention will be described with reference to FIGS. 10 and 11. FIG. 10 is a diagram schematically showing the configuration of a failure detecting means 36 according to the second embodiment of the invention. FIG. 11 is a flowchart showing a sequence of a control program of the failure detecting means 36 according to the second embodiment of the invention.

Figure 10:
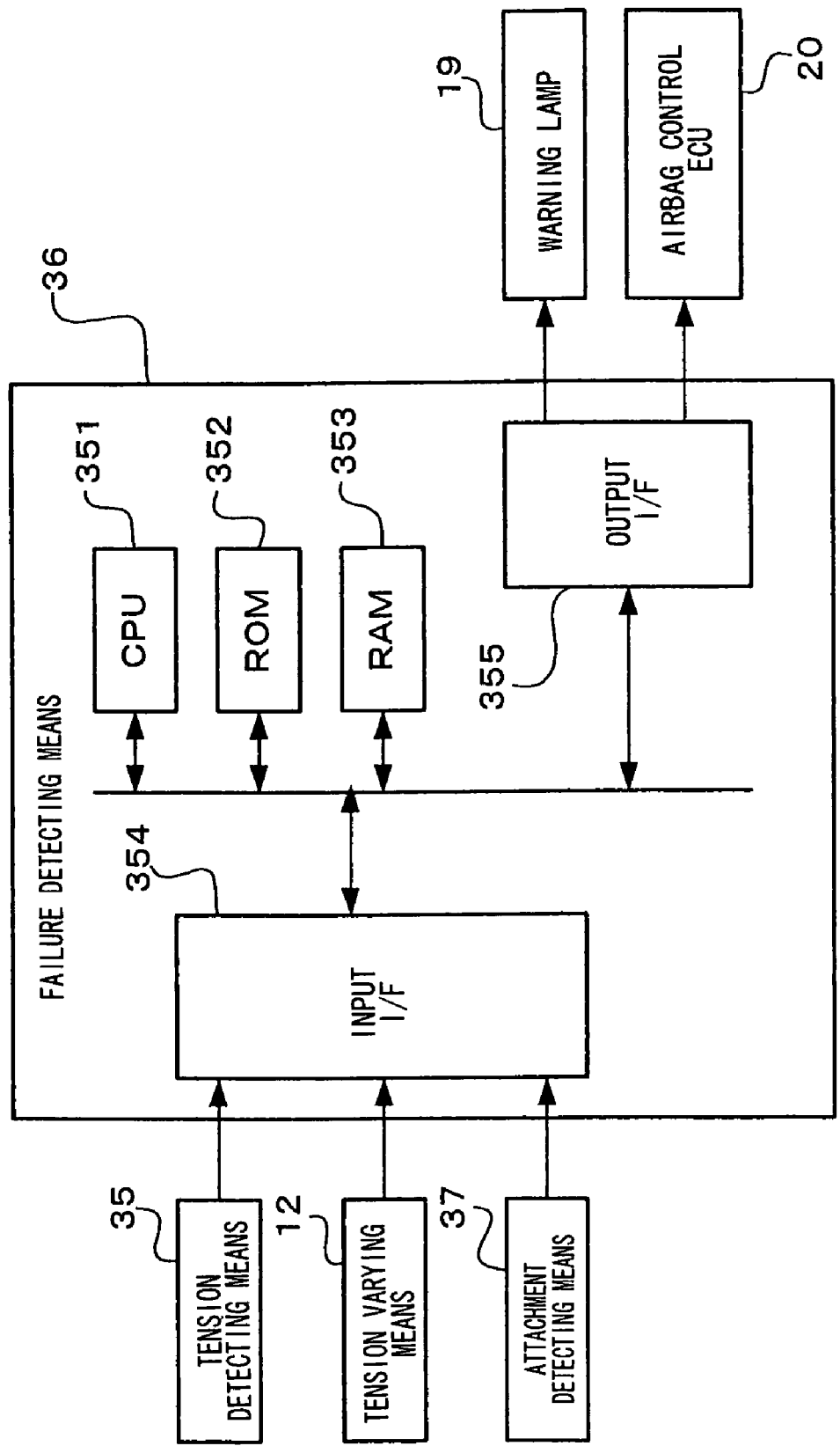
FIG. 10 is a diagram schematically showing a configuration of a failure detecting means according to the second embodiment of the invention.
Figure 11:
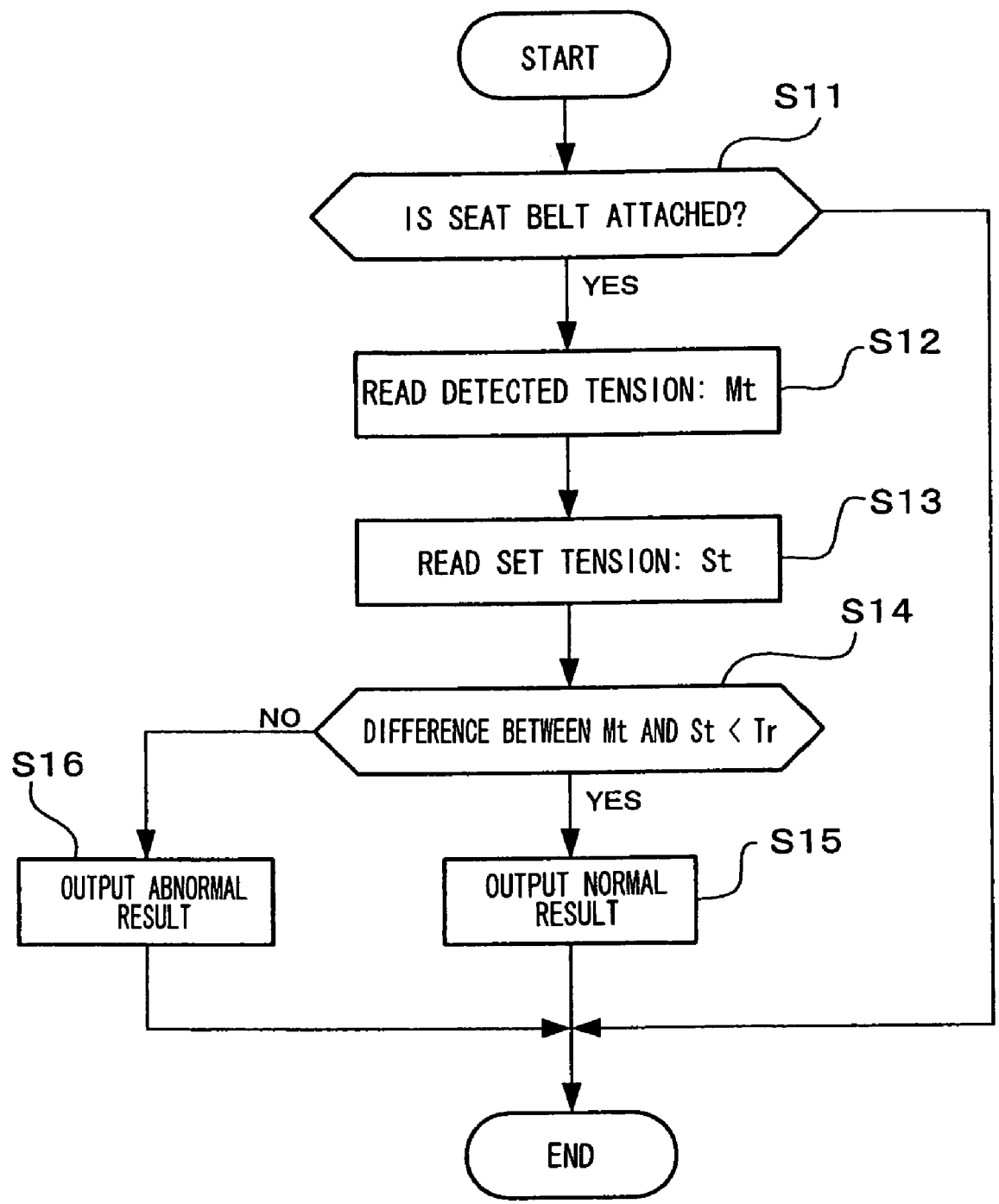
FIG. 11 is a flowchart showing a sequence of a control program of the failure detecting means according to the second embodiment of the invention.

As shown in FIG. 10, the failure detection means 36 includes a CPU (central processing unit) 351, a ROM (read only memory) 352, a RAM (random access memory) 353, an input interface 354, and an output interface 355.

The CPU 351 loads a control program and data stored in the ROM 352 into a work area of the RAM 353, and controls an operation of a warning lamp 19. The input interface 354 is connected to the tension varying means 12, the tension detecting means 35, and the attachment/detachment detecting means 37. The output interface 355 is connected to the warning lamp 19 and an airbag control ECU 20.

Next, a control program concerning the failure detecting means 36 according to the second embodiment of the invention will be described with reference to FIG. 11. In addition, the CPU 351 periodically executes the control program and judges whether or not the seat belt 11 is attached (Step S1). Here, whether or not the seat belt 11 is attached is judged with on/off of an attachment flag inputted from the buckle switch 37 via the input interface 354.

Next, the tension Mt detected from the tension detecting means 35 is read out (Step S12). Further, the tension St set by the tension varying means 12 is read out (Step S13).

Next, a difference Δ between the detected tension Mt and the set tension St is calculated, and the difference is compared to a predetermined value Tr (Step S14). When the difference Δ is smaller than the predetermined value Tr (Step S14: YES), it is judged that it is normal, a normal result is outputted, and the control program ends (Step S15). When the difference Δ is larger than the predetermined value Tr (Step S14: NO), it is judged that it is abnormal, an abnormal result is outputted, and the control program ends (Step S16). When the abnormal result is outputted, the warning lamp 19 turns on through the output interface 355, as shown in FIG. 9. In addition to or instead of turning on the lamp 19, an operation of the airbag is controlled through the airbag control ECU 20 according to the failure state of the seat belt device.

The predetermined value is selected as a value larger than a sum of the tension generated by an error of each of the tension varying means 12 and the tension detecting means 35, and the tension caused by frictional resistance of each part of the seat belt 11, such as the shoulder through 13, the buckle stay part 31, or the like, which is a loss generated when the tension is transmitted from the tension varying means 12 via the buckle stay part 31 to the tension detecting means 35.

In the seat belt device 30 of FIG. 9, the tension varying means 12 is provided at one end of the seat belt 11, and the tension detecting means 17 is provided at the buckle stay part 31 of the midportion of the seat belt 11. Therefore, as shown in FIG. 9, when a buckle sensor 37 detects that the seat belt 11 is attached to the occupant and the tension varying means 12 gives an appropriate tension to the seat belt 11, the given tension is outputted as the set tension and the output from the tension detecting means 35 is used as the detected tension, such that both can be compared to each other.

Third Embodiment

Figure 12:
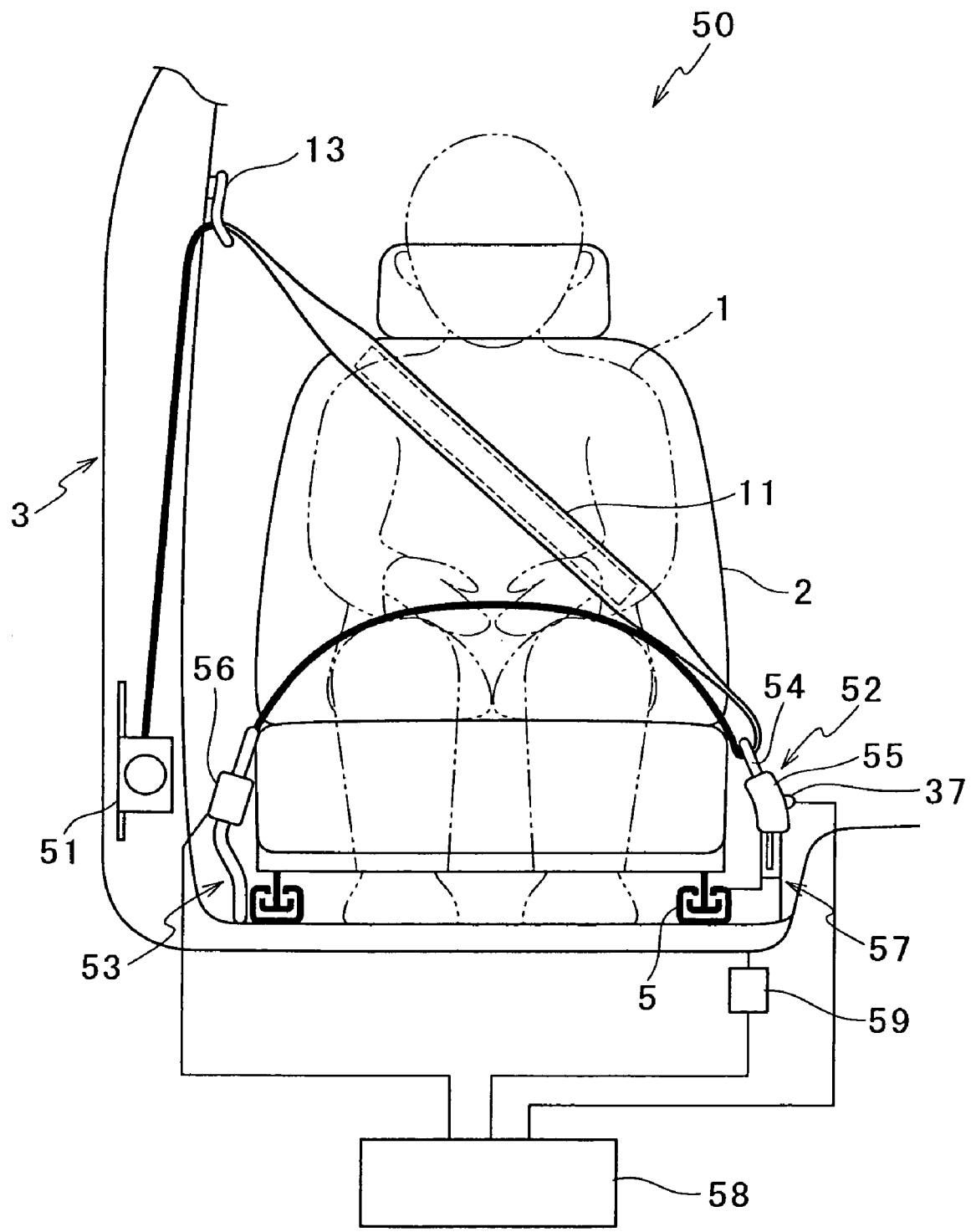
FIG. 12 is a diagram schematically showing a configuration of an electromotive belt winding device according to a third embodiment of the invention.

Next, a seat belt device 50 according to a third embodiment of the invention will be described with reference to FIGS. 12 to 16. FIG. 12 is a diagram schematically showing the configuration of an electromotive belt winding device according to the third embodiment of the invention.

The seat belt device 50 is of a three-point support type and includes a seat belt 11 for constraining an occupant 1 to a seat 2, a retractor 51 installed on a side surface of a vehicle body 3 for winding one end of the seat belt 11, a shoulder through 13 installed on an upper side of the side surface of the vehicle body 3 for turning down the seat belt 11 in the vicinity of a shoulder of the occupant 1, a buckle stay part 52 for detachably engaging a midportion of the seat belt 11 on the lower side of the vehicle body 3 in the vicinity of a waist of the occupant, and a lap anchor part 53 for fixing the other end of the seat belt 11 on a lower side of the side surface of vehicle body 3.

The buckle stay part 52 includes a through tongue 54 for turning down the seat belt 11, and a buckle 55 installed on the lower side of the vehicle body to be detachably engaged with the through tongue 54.

The seat belt device 50 further includes a tension detecting means 56 provided at the lap anchor part 53, a tension varying means 57 provided at the buckle 55 of the buckle stay part 52, a failure detecting means 58 connected to the tension varying means 57 and the tension detecting means 56, and an attachment/detachment detecting means (buckle switch) 37 provided at the buckle 55 for detecting the attachment/detachment of the through tongue 54.

The retractor (belt winding device) 51 has the same configuration as that described in the first embodiment, except that the belt is wound with the predetermined tension, not being varied. That is, a forcible locking mechanism and a pre-tensioner are included. An electromotive type is preferably, but the retractor may not be the electromotive type.

As described in the first embodiment, the tension detecting means 56 includes a mounting structure of the anchor plate 211 and the base plate 220, and a unit 230 in which the upper case 231 and the lower case 232 are incorporated in the same manner. That is, the tension given by the tension varying means 57 described below is detected by the tension detecting means 56. The tension cannot be detected when the seat belt 11 is not in an attachment state with respect to the buckle stay part 52. For this reason, the attachment/detachment detecting means 37 of the seat belt 11 is provided at the buckle 55, as in the same manner with the second embodiment.

Figure 13:
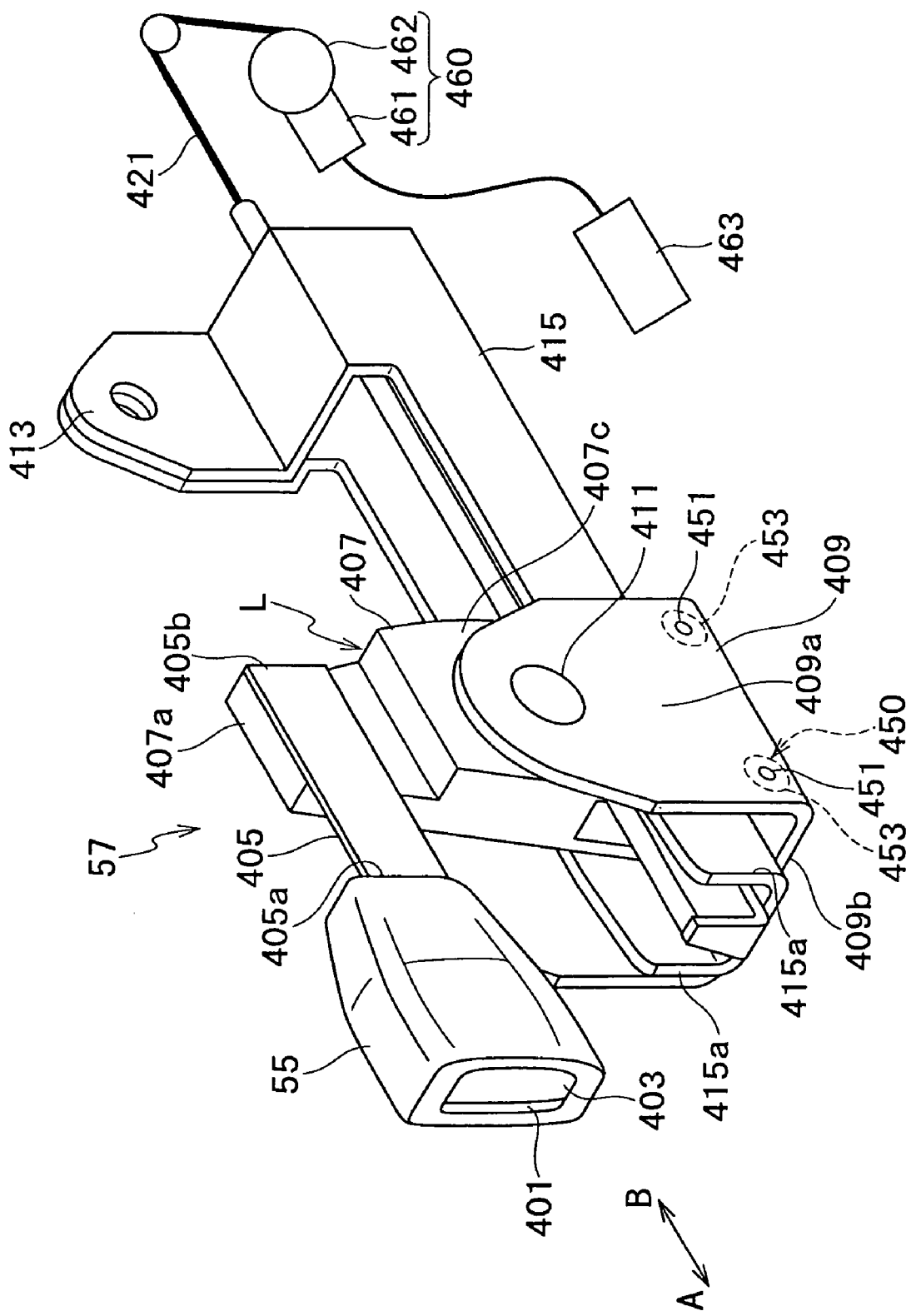
FIG. 13 is a perspective view of a tension varying means.
Figure 14:
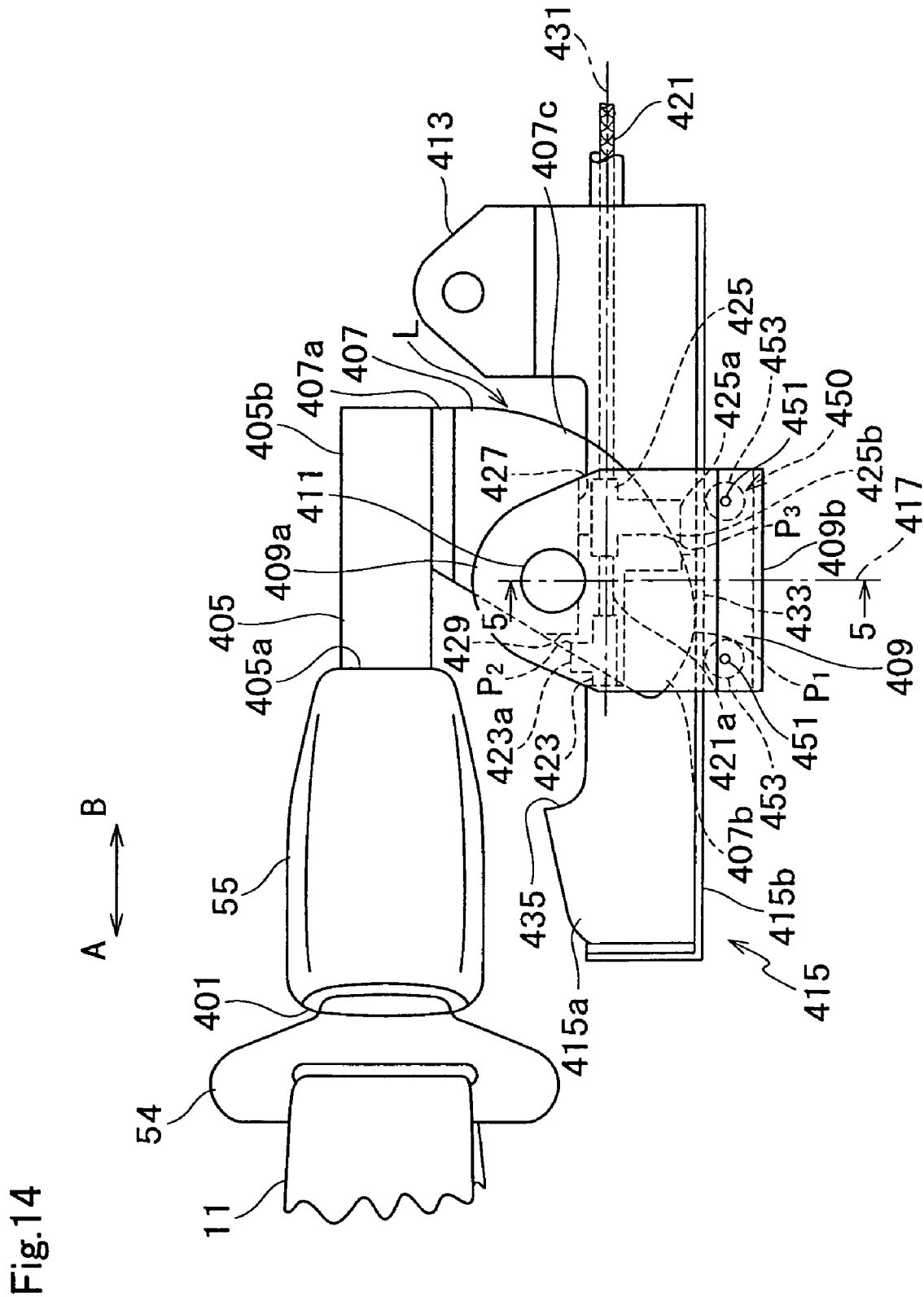
FIG. 14 is a side view of the tension varying means.
Figure 15:
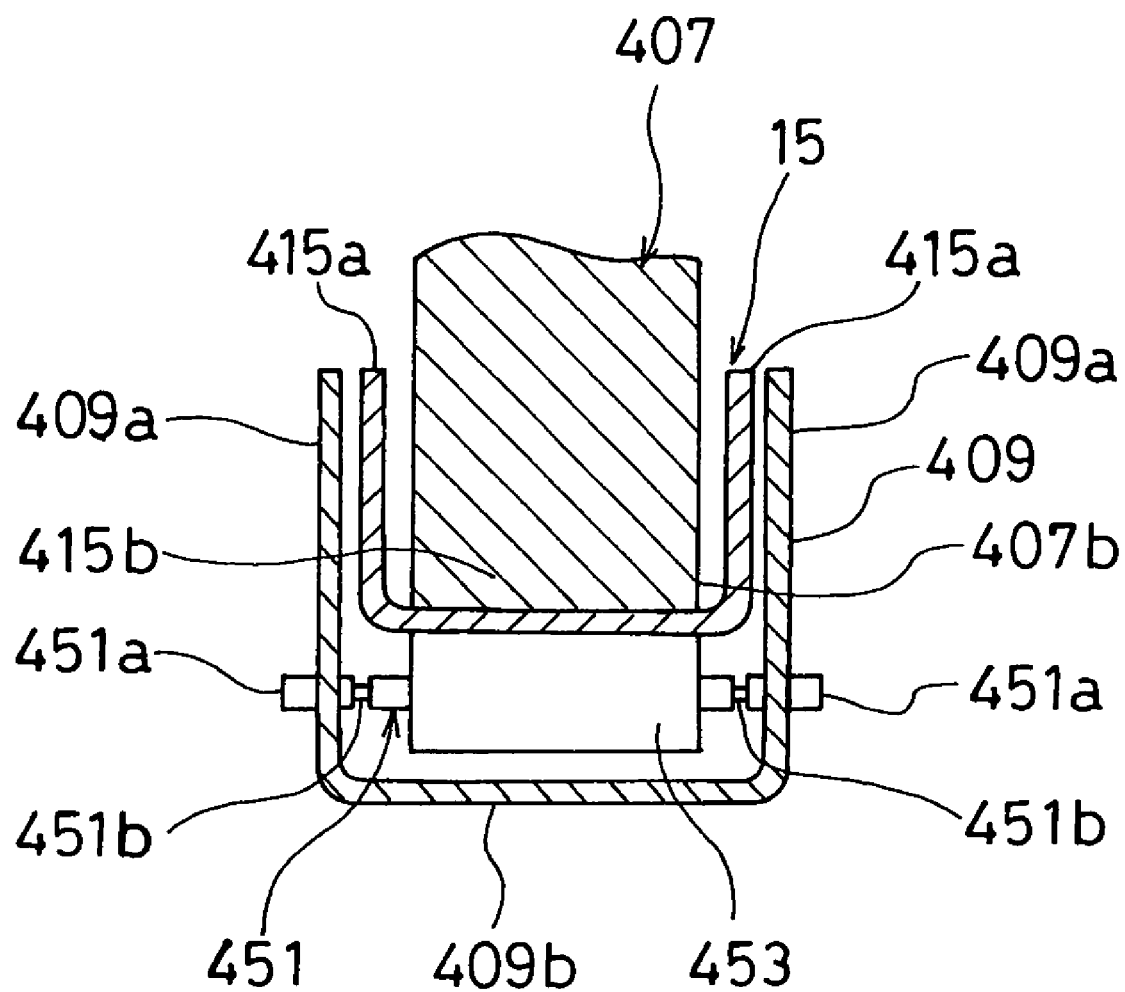
FIG. 15 is a cross-sectional view taken along the line 5-5 of FIG. 14.
Figure 16:
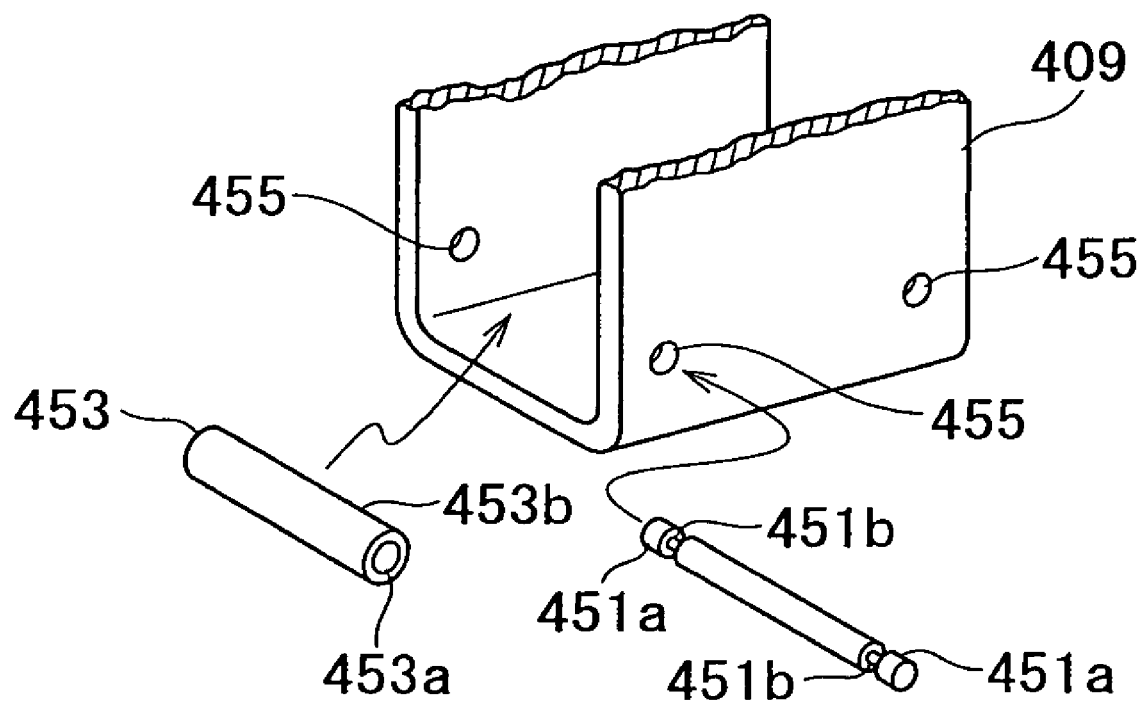
FIG. 16 is an exploded view of essential parts of the tension varying means.

Next, the configuration of the tension varying means 57 (locking means L having a reversible configuration) arranged between the buckle 55 and the vehicle body will be described with reference to FIGS. 13 to 16. FIG. 13 is a perspective view of the tension varying means. FIG. 14 is a side view of the tension varying means. FIG. 15 is a cross-sectional view taken along the line 5-5 of FIG. 14. FIG. 16 is an exploded view of primary components.

The tension varying means 57 shown in FIGS. 13 and 14 includes a buckle 55, into which the through tongue 54 of the seat belt 11 is inserted to be engaged and which is movable in a retraction direction and a protraction direction of the seat belt 11, a rail 415 arranged along the moving direction of the buckle 55, a locking means L that has a knuckle 407 being movably guided along the rail 415, together with the buckle 55 and having a rotational center and that blocks the movement of the buckle 55 in the protraction direction by causing the knuckle 407 to rotate and to be bit into the rail 415, a wire 421 that can be engaged in both the retraction and protraction directions with respect to the buckle 55 and move the locking means L in the retraction or protraction direction by allowing to be driven in any one direction, an electromotive winch 460 with respect to the wire 421, and a movement auxiliary member 450 that reduces movement resistance in the retraction direction of the locking means L between the locking means L and the rail 415. The electromotive winch 460 includes a motor 461 and a reel 462. The motor 461 is driven and controlled by the control unit 463.

The buckle 55 has a button 403 for releasing the engagement of the through tongue 54 and is fixed in a state in which an engagement opening 401 is directing toward a front end 405a of a support bar 405. A base end 405b of the support bar 405 is fixed to the knuckle 407 serving as a movable part that moves integrally with the buckle 55. In the knuckle 407, one end 407a thereof is coupled to the support bar 405 at about right angles, and the other end part 407*b* serving as a locking part is inserted between two sideboards 409*a* and 409*a* of a slider 409 having a U-shaped section. On both sideboards 409*a* and 409*a* of the slider 409 having the U-shaped section, a center pin (rotational center) 411 passes through as a rotational shaft, and the midportion 407*c* of the knuckle 407 is rotatably connected to the center pin 411. Therefore, when a force is exerted on the buckle 55 in the retraction direction, as indicated by an arrow A of FIG. 14 (in the front end direction of the support bar 405), a rotational momentum is exerted on the knuckle 407 in a counterclockwise direction in the drawing, with a center of the center pin 411 as a rotational shaft.

The slider 409 is inserted outside the rail 415 serving as a non-movable guide member having a bracket 413 installed on the end and is supported slidably along the rail 415. The rail 415 has a mounting bracket 413 fixed to the vehicle body and the seat, and is arranged along a longitudinal direction of the vehicle body. The buckle 55 is slidably supported through the knuckle 407, the center pin 411 and the slider 409, in the front direction of the vehicle body (the arrow A direction) of the seat belt protraction direction, which is the first direction, and in the rear direction of the vehicle body (the arrow B direction) of the seat belt retraction direction, which is the second direction, along the rail 415.

The rail 415 has sideboards 415*a* and 415*a* at both ends in the widthwise direction, and the other end part 407*b* of the knuckle 407 is disposed between two sideboards 415*a* and 415*a*. Therefore, as shown in FIG. 14, the force in the front direction of vehicle direction (A direction) is exerted on the buckle 55, the rotational momentum is generated. When the knuckle 407 rotates in the counterclockwise direction, a point P1 at an outer circumference of the other end part 7*b* of the knuckle 407 is bit into the bottom wall 415*b* of the rail 415, and thus the movement of the knuckle 407, that is, the movement of the buckle 55, can be blocked.

In this case, the bite point P1 is located at the front side of the vehicle body in a vertical line 417 down to the bottom wall 415*b* of the rail 415 from a center of the center pin 41, as shown in FIG. 14. Accordingly, as a retraction force in the front direction of the vehicle body is exerted on the buckle 55, the bite operation becomes tighter and a locking force becomes larger. At this time, the knuckle 407, the center pin 411, and the rail 415 constitute the locking means L for preventing the movement of the buckle 55.

In addition, in the rail 415, one end of the wire (driving wire) 421 is wired to move the knuckle 407 in the longitudinal direction of the vehicle body of the A direction or the B direction. The wire 421 is arranged along the rail 415, as shown in FIG. 14, and located at about a middle point between the center pin 411 and the cut-into point P1. The wire 421 moves in the A direction and in the B direction, with an actuator of the motor connected to the base end, so that the front end 421*a* thereof is inserted into a through hole 427 passing through and being formed in the front end 407*b* of the knuckle 407, and two hooks 423 and 425 engaged with the knuckle 407 are fixed.

The front-end hook 423 is a retracting hook for the retraction movement of the buckle 55 in the rear direction of the vehicle body (in the B direction), and the other hook 425 is a protracting hook for a protraction movement of the buckle 55 in the front direction of the vehicle body (in the A direction), such that the buckle 55 can be reversibly driven with the hooks 423 and 425.

The retracting hook 423 has a clinch part 423*a* protruding toward the center pin 411, and a side surface in the B direction of the clinch part 423*a* faces an engagement wall 429 formed at the end of the through hole 427 of the knuckle 407. Therefore, when the wire 421 is driven in the B direction and the retracting hook 423 is moved, an engagement operation point P1 of the above-described side surface of the clinch part 423*a* comes in contact with the engagement wall 429 of the knuckle 407, so that the force in the retraction direction of the seat belt (force in the B direction) is transmitted from the retracting hook 423 to the other end 407*b* of the knuckle 407. In this case, the engagement operation point P2 is disposed between the center line (core wire) 431 of the wire 421 and the center pin (rotational center) 411, and also is disposed on the center pin 411 (rotational center) while being spaced by a distance from a center line 431 of the wire 421.

In addition, when the protracting hook 425 has the clinch part 425*a* protruding opposite to the center pin 411, a protrusion 425*b* disposed at the front end of the side surface facing the A direction of the clinch part 425*a* faces an engagement wall 433 toward the B direction of the knuckle 407. Therefore, when the wire 421 is driven in the A direction and the protracting hook 425 is moved, an engagement operation point P3 of the front end of the protrusion 425*b* comes in contact with the engagement wall 433 of the knuckle 407, and thus the force in the seat belt retraction direction (force in the A direction) is transmitted to the other end 407*b* of the knuckle 407 from the protracting hook 425. In this case, the engagement operation point P3 is disposed on an opposite side to the center pin (rotational center) 411 with the wire 421 interposed therebetween while being spaced by a distance from the center line 431 of the wire 421.

In addition, as shown in FIG. 14, stopper parts 435 are provided at the sideboards 415*a* and 415*a* of the rail 415 to define a movement limit of the slider 409 and the knuckle 407. The stopper parts 435 are disposed to come in contact with the center pin 411.

Further, the movement auxiliary member 450 is provided, as shown in FIGS. 15 and 16. That is, the movement auxiliary member 450 includes a support member 451 and a contact body 453 and is supported by the slider 409. Specifically, the bottom wall 409*b* of the slider 409 is formed to maintain a predetermined interval with respect to the bottom wall 415*b* of the rail 415. The support member 451 and the contact body 453 are disposed between the bottom walls 409*b* and 415*b*.

The support member 451 is provided with a support shaft, and deformable parts 451*b* are provided at both ends 451*a* thereof. The deformable parts 451*b* are arranged to have a diameter smaller than those of other parts of the support member 451. Thus, both ends 451*a* are supported to support holes 455 provided at two locations of the sidewalls 409*a* of the slider 409. As for the support, snap rings (not shown) are fitted into both ends 451*a* and thus loosening is prevented.

The above-described contact body 453 may be made of one of high-density polyethylene, polytetrafluoro ethylene, polyamide, and polyacetal. Alternatively, the contact body 453 may be made of a hollow cylindrical body, which is formed by coating one of polyethylene, polytetrafluoro ethylene, polyamide, and polyacetal on a surface of a metal mold product. The inner circumference 453*a* of the contact body 453 is formed to have an outer diameter larger than those of other parts of the support member 451, is loosely fitted into the support member 451 to freely rotate.

Next, an operation of the tension varying means 57 will be described. In the case of emergency, when an emergency condition occurs due to a sudden deceleration to a certain level or more, the retractor (not shown) is locked, the motor (not shown) rotates forwardly according to the detection of the emergency condition, and the wire 421 is instantaneously retracted in the seat belt retraction direction B. With the retraction operation, the clinch part 423*a* of the hook 423 is engaged with the engagement wall 429, and the knuckle 407 is moved in the B direction. With this movement, the slider 409 is guided into the rail 415, and the locking means L is moved in the B direction as a whole. As such, the buckle 55 is retracted in the same direction to retract the seat belt 11 in the same direction via the through tongue 54 by a predetermined amount. Therefore, looseness of a shoulder belt and a lap belt is eliminated at the same time and thus the belt can be tensioned.

Thus, when the locking means L moves in the B direction, the movement resistance is reduced by the movement auxiliary member 450, and the locking means L can smoothly move in the B direction with respect to the rail 415 as a whole. That is, when the knuckle 407 is retracted by the wire 421 and the slider 409 moves along the rail 415, the slider 409 also somewhat undergoes a moment in a counterclockwise direction, as shown in FIG. 14. At this time, the contact body 453 comes in contact with and rotates around the bottom wall 415b of the rail 415, and thus the movement resistance is reduced. With such a reduced movement resistance effect, the movement can be instantaneously made using a small actuator.

At the same time, when the seat belt 11 receives the tension from the occupant to allow a force to be exerted, the buckle 55 moves in the A direction. In such a manner, the knuckle 407 is integrally retracted in the same direction and rotates around the center pin 411. Therefore, the bite point P1 of the other end 407b of the knuckle 407 is bit into the bottom wall 415b of the rail 415. With the bite force, the slider 409 is raised relatively upward through the center pin 411. Therefore, the deformable part 451b of the support shaft 451 is easily deformed, and the movement auxiliary member 450 having the support shaft 451 and the hollow cylindrical body 453 is broken. Therefore, a function to reduce the movement resistance of the movement auxiliary member 450 is degraded or lost. Accordingly, the buckle 55 is surely fixed so as not to move in the A direction of the seat belt loosening direction. Therefore, the seat belt 11 can surely constrain the occupant.

If the emergency condition is avoided, even when the buckle 55 is locked due to the sudden deceleration, as described above, the buckle 55 is reversibly driven when the emergency condition is avoided, and thus returns to an original state. That is, when the wire 421 is driven in the A direction by the detection of the avoidance of the emergency condition, the force in the A direction is exerted on the knuckle 407 from the hook 425. Accordingly, the knuckle 407 rotates the center pin 411 in a reverse direction a little, and bite locking at the bite point P1 is released. Next, the buckle 55 integrated with the knuckle 407 moves in the A direction, and the seat belt 11 returns to the original looseness state. Moreover, the broken movement auxiliary member 450 is suitably changed. However, when the emergency condition is a trivial one, naturally, the movement auxiliary member 450 will not reach the broken state. In this case, a reversible operation is more smoothly performed.

As described above, the buckle 55 can reversibly be moved, and thus, even when the emergency condition is avoided, the occupant can continue to drive the vehicle with the seat belt 11 returned to the original looseness state. Therefore, a coupling device with very high performance is obtained. Further, with the movement auxiliary member 450, the buckle 55 can be smoothly moved in the retraction direction B, and thus high performance can be realized.

In addition, the motor 461 of the electromotive winch 460 for driving the wire 421 is, for example, a direct current (DC) motor. The number of rotations of the direct current motor is proportional to the current to be supplied to the direct current motor. When the direct current motor rotates forwardly, the current supplied to the direct current motor is proportional to the tension of the seat belt 11. In addition, the value of the current flowing in the direct current motor is detected as the value of a voltage corresponding to the current by a current detector provided at the motor driving circuit and is outputted to the failure detecting means 58, which is described below. The current of the direct current motor has relation to a rotational torque of the direct current motor, so that the rotational torque, that is, the tension given to the seat belt 11, can be estimated by using a load current value.

Moreover, the control configuration and sequence of the failure detecting means 58 are the same manner as those described in the second embodiment.

Fourth Embodiment

Figure 17:
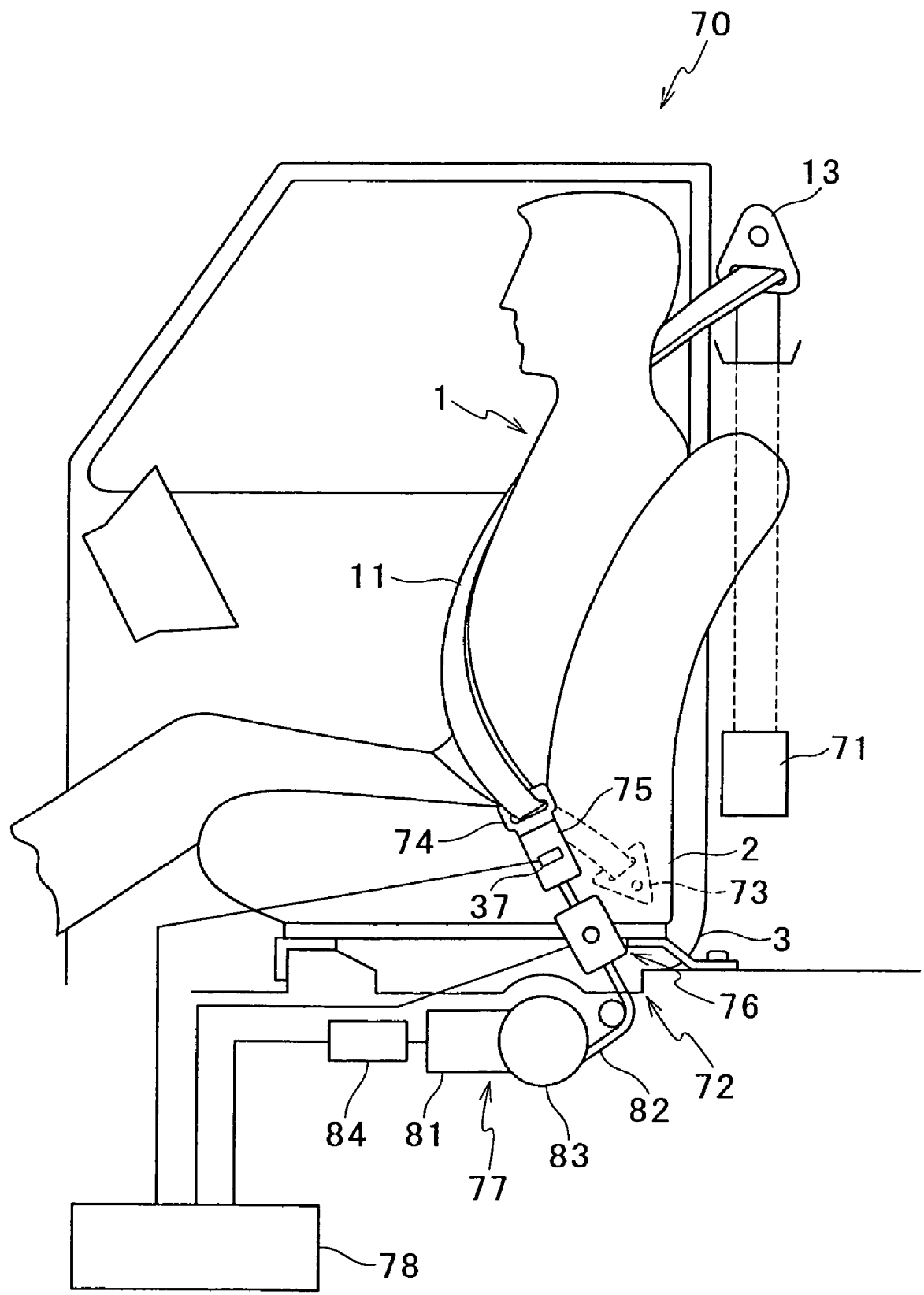
FIG. 17 is a diagram schematically showing a configuration of an electromotive belt winding device according to a fourth embodiment of the invention.

Next, a seat belt device 30 according to a fourth embodiment of the invention will be described with reference to FIG. 17. FIG. 17 is a diagram schematically showing the configuration of an electromotive belt winding device according to the fourth embodiment of the invention.

The seat belt device 70 is of a three-point support type and includes a seat belt 11 for constraining an occupant 1 to a seat 2, a retractor 71 installed on a side surface of a vehicle body 3 for winding one end of the seat belt 11, a shoulder through 13 installed on an upper side of the side surface of the vehicle body 3 for turning down the seat belt 11 in the vicinity of a shoulder of the occupant 1, a buckle stay part 72 for detachably engaging a midportion of the seat belt 11 on a lower side of the vehicle body 3 in the vicinity of a waist of the occupant, and a lap anchor part 73 for fixing the other end of the seat belt 11 on a lower side of the side surface of vehicle body 3.

The buckle stay part 72 includes a through tongue 74 for turning down the seat belt 11, and a buckle 75 installed on the lower side of the vehicle body to be detachably engaged with the through tongue 74.

The seat belt device 70 further includes a tension detecting means 76 and a tension varying means 77 provided at the buckle 75 of the buckle stay part 72, a failure detecting means 78 connected to the tension varying means 77 and the tension detecting means 76, and an attachment/detachment detecting means (buckle switch) 37 provided at the buckle 55 for detecting the attachment/detachment of the through tongue 74.

As described in the first embodiment, the tension detecting means 76 includes a mounting structure of the anchor plate 211 and the base plate 220, and a unit 230 in which the upper case 231 and the lower case 232 are incorporated in the same manner. That is, the tension given by the tension varying means 77 described below is detected by the tension detecting means 76. The tension cannot be detected when the seat belt 11 is not attached to the buckle stay part 72. For this reason, the attachment/detachment detecting means 37 of the seat belt 11 is provided at the buckle 75 in the same manner as in the second embodiment.

Next, the tension varying means 77 arranged between the buckle 75 and the vehicle body will be described. In the drawing, the tension varying means 77 includes an electromotive winch, serving as the tension varying means 77 that retracts or protracts the seat belt 11 into or from the buckle 75, and having a motor 81 and a reel 83, on which a wire 82 connected to the tension detecting means 76 is wound.

Since the motor 81 rotates forwardly and reversely, the wire 82 can be retracted and protracted. A control unit 84 drives the motor 81 to eliminate loosening of the seat belt 11. In this case, by detecting the value of the current of the motor 81, the tension of the belt can also be estimated.

Though the retractor (belt winding device) 71 preferably has a forcible locking mechanism and a pre-tensioner, as described in the first embodiment, an electromotive retractor may be not provided.

In addition, the control configuration and sequence of the failure detecting means 78 are the same as the second embodiment. Here, both the tension detecting means 76 and the tension varying means 77 are arranged in series in the buckle stay part 72. Accordingly, a friction caused by the guidance of the seat belt 11 has little effect, except for the error of the tension detecting means 76 and the tension varying means 77. For this reason, failures of at least one of the tension detecting means 76 and the tension varying means 77 can be accurately detected.

Moreover, though the preferred embodiments of the invention have been described, the invention is not limited hereto. It should be understood that various changes and/or modifications can be made without departing from the spirit and scope of the invention.

The invention claimed is:

1. A seat belt device comprising:
   a seat belt for constraining an occupant to a seat;
   tension varying means constructed and arranged for applying a tension to the seat belt, wherein the tension varying means is provided at a first part supporting the seat belt or a second part supporting the seat belt;
   tension detecting means for detecting an actual tension on the seat belt, wherein the tension detecting means is provided at the first part supporting the seat belt or the second part supporting the seat belt; and
   failure detecting means for comparing the tension applied by the tension varying means to the actual tension detected by the tension detecting means, to detect failures of at least one of the tension varying means and the tension detecting means when a difference between the tension applied by the tension varying means and the actual tension measured by the tension detecting means is greater than a predetermined value, wherein the predetermined value is selected as a value larger than a tension loss from the tension varying means to the tension detecting means.

2. The seat belt device according to claim 1,
   wherein the seat belt is a three-point support belt, one end of the belt being supported at an electromotive retractor in such a manner as to be freely wound, an other end of the belt being supported at a lap anchor part, and a midportion of the belt being supported at a buckle stay part,
   the tension varying means is provided at the electromotive retractor, and
   the tension detecting means is provided at the lap anchor part.

3. The seat belt device according to claim 1,
   wherein the seat belt is a three-point support belt, one end of the belt being supported at an electromotive retractor in such a manner as to be freely wound, other end of the belt being supported at a lap anchor part, and a midportion of the belt being supported at a buckle stay part,
   the tension varying means is provided at the retractor and the tension detecting means is provided at the buckle stay part, or the tension varying means is provided at the buckle stay part and the tension detecting means is provided at the lap anchor part, or the tension varying means and the tension detecting means are provided at the buckle stay part,
   the buckle stay part is provided with an attachment/detachment detecting means for detecting an attachment of the seat belt, and
   the failure detecting means is actuated when the attachment/detachment detecting means is detecting the attachment of the seat belt.

4. The seat belt device according to claim 1, the failure detecting means comprising an output connected to a warning lamp, wherein the warning lamp is lit when an error in the tension varying means or tension detecting means is detected.

5. The seat belt device according to claim 1, the failure detecting means comprising an output connected to an airbag control.

6. A seat belt device comprising:
   a three point seat belt for constraining an occupant to a seat, one end of the belt being supported at an electromotive retractor in such a manner as to be freely wound, other end of the belt being supported at a lap anchor part, and a midportion of the belt being supported at a buckle stay part;
   tension varying means constructed and arranged for applying a tension to the seat belt, wherein the tension varying means is provided at the electromotive retractor;
   tension detecting means for detecting an actual tension on the seat belt, the tension detecting means is provided at the lap anchor part; and
   failure detecting means for comparing the tension applied by the tension varying means to the actual tension detected by the tension detecting means, to detect failures of at least one of the tension varying means and the tension detecting means when a difference between the tension applied by the tension varying means and the actual tension measured by the tension detecting means is greater than a predetermined value, wherein the predetermined value is selected as a value larger than a tension loss from the tension varying means to the tension detecting means.

7. A seat belt device comprising:
   a three point seat belt for constraining an occupant to a seat, one end of the belt being supported at an electromotive retractor in such a manner as to be freely wound, other end of the belt being supported at a lap anchor part, and a midportion of the belt being supported at a buckle stay part;
   tension varying means constructed and arranged for applying a tension to the seat belt;
   tension detecting means for detecting an actual tension on the seat belt;
   an attachment/detachment detecting means for detecting an attachment of the seat belt, which is provided at the buckle stay part;
   failure detecting means for comparing the tension applied by the tension varying means to the actual tension detected by the tension detecting means, to detect failures of at least one of the tension varying means and the tension detecting means when a difference between the tension applied by the tension varying means and the actual tension measured by the tension detecting means is greater than a predetermined value, wherein the predetermined value is selected as a value larger than a tension loss from the tension varying means to the tension detecting means, and wherein the failure detecting means is actuated when the attachment/detachment detecting means is detecting the attachment of the seat belt; and
   the tension varying means is provided at the retractor and the tension detecting means is provided at the buckle stay part, or the tension varying means is provided at the buckle stay part and the tension detecting means is provided at the lap anchor part, or the tension varying means and the tension detecting means are provided at the buckle stay part.

8. A method of detecting an error in a seat belt device comprising a seat belt for constraining an occupant to a seat, tension varying means constructed and arranged for applying a tension to the seat belt, tension detecting means for detecting an actual tension on the seat belt; and failure detecting means for comparing the tension applied by the tension varying means to the actual tension detected by the tension detecting means, the method comprising;

applying a tension to the seat belt using the tension varying means;

measuring the actual tension on the seat belt using the tension detecting means;

using the failure detecting means to measure a difference between the tension applied by the tension varying means and the actual tension measured by the tension detecting means; and if the difference is greater than a predetermined value determining that an error has occurred in at least one of the tension varying means or the tension detecting means, wherein the predetermined value is selected as a value larger than a tension loss from the tension varying means to the tension detecting means.

9. A method according to claim 8, wherein the seatbelt further comprises an attachment/detachment means for detecting an attachment of the seat belt, the method further comprising determining whether the seat belt is attached using the attachment/detachment means and actuating the failure detecting means when the seat belt is determined to be attached by the attachment/detachment means.

10. Method according to claim 8, further comprising lighting a warning lamp when an error in the tension varying means or tension detecting means is detected.

11. Method according to claim 8, further comprising outputting a signal to an airbag control when an error in the tension varying means or tension detecting means is detected.

* * * * *